(12) United States Patent
Rawat

(10) Patent No.: US 7,856,209 B1
(45) Date of Patent: Dec. 21, 2010

(54) METHOD AND SYSTEM FOR LOCATION ESTIMATION IN WIRELESS NETWORKS

(75) Inventor: Jai Rawat, Sunnyvale, CA (US)

(73) Assignee: AirTight Networks, Inc., Mountain View, CA (US)

( * ) Notice: Subject to any disclaimer, the term of this patent is extended or adjusted under 35 U.S.C. 154(b) by 988 days.

(21) Appl. No.: 11/291,510

(22) Filed: Nov. 30, 2005

Related U.S. Application Data

(63) Continuation-in-part of application No. 10/966,353, filed on Oct. 15, 2004, now Pat. No. 7,002,943.

(60) Provisional application No. 60/560,034, filed on Apr. 6, 2004, provisional application No. 60/543,631, filed on Feb. 11, 2004, provisional application No. 60/610,417, filed on Sep. 16, 2004, provisional application No. 60/610,419, filed on Sep. 16, 2004, provisional application No. 60/607,812, filed on Sep. 8, 2004, provisional application No. 60/607,897, filed on Sep. 8, 2004, provisional application No. 60/569,024, filed on May 7, 2004, provisional application No. 60/527,673, filed on Dec. 8, 2003.

(51) Int. Cl.
*H04B 17/00* (2006.01)

(52) U.S. Cl. ............. 455/67.11; 455/456.1; 455/435.1; 455/552.1; 370/338; 370/469

(58) Field of Classification Search ............. 455/456.1, 455/67.11, 435.1, 552.1; 370/338, 469
See application file for complete search history.

(56) References Cited

U.S. PATENT DOCUMENTS

| | | | |
|---|---|---|---|
| 4,914,546 | A | 4/1990 | Alter |
| 5,187,637 | A | 2/1993 | Embree |
| 5,301,150 | A | 4/1994 | Sullivan et al. |
| 5,354,701 | A | 10/1994 | Chao |
| 5,587,869 | A | 12/1996 | Azumi et al. |
| 5,831,692 | A | 11/1998 | Lee |

(Continued)

FOREIGN PATENT DOCUMENTS

WO    WO 01/93531    12/2001

(Continued)

OTHER PUBLICATIONS

Air Defense Inc., [Data Sheet], AirDefense Data Sheet, 2 pages.

(Continued)

*Primary Examiner*—Sanh D Phu
(74) *Attorney, Agent, or Firm*—AirTight Networks; Hemant M. Chaskar

(57) ABSTRACT

A method of estimating a location of a wireless device providing a wireless attack. The method includes disposing a number of sniffers in a geographic region and receiving a number of wireless signals at one or more of the number of sniffers. The method also includes processing the number of wireless signals to identify a subset of the number of wireless signals that are associated with the wireless device and determining a number of received signal strengths associated with the subset of the number of wireless signals. The method further includes providing an estimation of the location of the wireless device utilizing the determined received signal strengths associated with the subset of the number of wireless signals.

24 Claims, 12 Drawing Sheets

U.S. PATENT DOCUMENTS

| | | | |
|---|---|---|---|
| 5,908,443 | A | 6/1999 | Brewer et al. |
| 5,926,064 | A | 7/1999 | Hariton |
| 5,987,306 | A * | 11/1999 | Nilsen et al. ............. 455/67.11 |
| 6,137,153 | A | 10/2000 | Le et al. |
| 6,242,989 | B1 | 6/2001 | Barber et al. |
| 6,262,469 | B1 | 7/2001 | Le et al. |
| 6,269,246 | B1 | 7/2001 | Rao et al. |
| 6,353,406 | B1 | 3/2002 | Lanzl |
| 6,389,294 | B1 | 5/2002 | Sipila |
| 6,393,294 | B1 | 5/2002 | Perez-Breva et al. |
| 6,414,634 | B1 | 7/2002 | Tekinay |
| 6,429,812 | B1 * | 8/2002 | Hoffberg ................. 342/357.1 |
| 6,563,691 | B2 | 5/2003 | Kijima et al. |
| 6,646,499 | B2 | 11/2003 | Tiebout |
| 6,664,609 | B2 | 12/2003 | Hyde et al. |
| 6,664,925 | B1 | 12/2003 | Moore et al. |
| 6,674,403 | B2 | 1/2004 | Gray |
| 6,754,488 | B1 | 6/2004 | Won et al. |
| 6,782,265 | B2 | 8/2004 | Perez-Breva et al. |
| 6,799,047 | B1 | 9/2004 | Bahl et al. |
| 6,839,560 | B1 | 1/2005 | Bahl et al. |
| 6,897,776 | B1 | 5/2005 | Haycraft |
| 6,990,428 | B1 | 1/2006 | Kaiser et al. |
| 7,086,089 | B2 | 8/2006 | Hrastar et al. |
| 7,110,756 | B2 | 9/2006 | Diener |
| 7,286,515 | B2 | 10/2007 | Olson et al. |
| 7,302,269 | B1 | 11/2007 | Crawford et al. |
| 7,307,980 | B1 | 12/2007 | Shah |
| 2001/0052014 | A1 | 12/2001 | Sheymov et al. |
| 2003/0135762 | A1 | 7/2003 | Macaulay |
| 2003/0137453 | A1 | 7/2003 | Hannah |
| 2003/0185244 | A1 | 10/2003 | Wu et al. |
| 2003/0186679 | A1 | 10/2003 | Chaffener et al. |
| 2003/0217283 | A1 | 11/2003 | Hrastar et al. |
| 2003/0217289 | A1 | 11/2003 | Ammon et al. |
| 2003/0218570 | A1 | 11/2003 | Moore |
| 2003/0219008 | A1 | 11/2003 | Hrastar |
| 2003/0221006 | A1 | 11/2003 | Kuan et al. |
| 2003/0232598 | A1 | 12/2003 | Alldajeff et al. |
| 2003/0233567 | A1 | 12/2003 | Lynn et al. |
| 2003/0236990 | A1 | 12/2003 | Hrastar et al. |
| 2004/0003285 | A1 | 1/2004 | Whelan et al. |
| 2004/0008652 | A1 * | 1/2004 | Tanzella et al. ............. 370/338 |
| 2004/0023640 | A1 | 2/2004 | Ballai |
| 2004/0028000 | A1 | 2/2004 | Billhartz |
| 2004/0028017 | A1 | 2/2004 | Whiteill et al. |
| 2004/0072577 | A1 | 4/2004 | Myllymaki |
| 2004/0078151 | A1 | 4/2004 | Aljadeff et al. |
| 2004/0098610 | A1 | 5/2004 | Hrastar |
| 2004/0137915 | A1 | 7/2004 | Diener et al. |
| 2004/0152470 | A1 | 8/2004 | Spain |
| 2004/0157624 | A1 | 8/2004 | Hrastar |
| 2004/0203764 | A1 | 10/2004 | Hrastar et al. |
| 2004/0206999 | A1 | 10/2004 | Hyde et al. |
| 2004/0252837 | A1 | 12/2004 | Harvey et al. |
| 2005/0039047 | A1 | 2/2005 | Raikar et al. |

FOREIGN PATENT DOCUMENTS

| | | |
|---|---|---|
| WO | 03389483 A | 12/2003 |
| WO | WO 2004/019559 | 3/2004 |
| WO | WO 2004/028121 | 4/2004 |
| WO | WO 2004/059912 | 7/2004 |
| WO | 2004095192 A2 | 11/2004 |

OTHER PUBLICATIONS

Air Defense Inc., [Data Sheet], AirDefense 4.0, 2 pages.

Air Defense Inc., AirDefense Guard 3.5, 2 pages.

Air Defense Inc., Release Notes r4.0, 18 pages.

Air Defense Inc., [Brochure], Enterprise Wireless LAN Security, 4 pages.

Air Defense Inc., [User Guide], AirDefense Mobile: Integrated WLAN Security Appliance 94 pages.

Air Defense Inc., Integrated WLAN Security Solutions, Quick Start Release 3.0, 16 pages.

Air Defense Inc., Wireless LAN Monitoring Solutions, Issue 1.1, Quick Start Release 3.5, 42 pages.

Air Defense Inc., [User Guide] Wireless LAN Monitoring Solutions, Release 3.5, 374 pages.

Air Defense Inc., [User Guide] AirDefense Version 2.0, Integrated WLAN Security Appliance, 131 pages.

Air Defense Inc., [User Guide] Integrated WLAN Security Solutions, Release 2.1, 164 pages.

Air Defense Inc., [User Guide] AirDefense Guard, Issue 2.2, Release 3.0, 317 pages Air Defense Inc., [User Guide] AirDefense Guard, Issue 1.02, Release 3.0, 295 pages.

Air Defense Inc., [Brochure], Enterprise Wireless LAN Security, 4 pages.

Air Defense Inc., [Data Sheet], Enterprise Wireless LAN Security, 2 pages.

Air Defense Inc., [White Paper], Wireless LANs: Risks and Defenses, 7 pages.

Bahl et al., "RADAR: An In-Building RF-based User Location and Tracking System", *IEEE Infocom 2000*, vol. 2, pp. 775-784, (Mar. 2000).

Bellardo et al., "Denial-of-Service Attacks: Real Vulnerabilities and Practical Solutions, Department of Computer and Science Engineering," University of California at San Diego, Proceedings of the USENIX Security Symposium, Washington, DC, 18 pages, (Aug. 2003).

Castro et al., "A Probabilistic Location Service for Wireless Network Environments", *UbiquitoComputing* 2001, 18 pages, (Sep. 2001).

Chirumamilla et al., "Agent Based Intrusion Detection and Response System for Wirless LANs," Dept. of Comput. Sci. & Eng., Nebraska Univ., Lincoln, NE, USA This paper appears in: *Communications, 2003. ICC '03. IEEE International Conference*, vol. 1, pp. 492-496 (May 11-15, 2003).

Clouqueur et al., "Sensor Deployment Strategy for Detection of Targets Traversing a Region,"*Mobile Networks and Applications* vol. 8, No. 4, pp. 453-461 (Apr. 2003).

Ganu et al., "Infrastructure-based location estimation in WLAN Networks," IEEE Wireless Communications and Networking Conference (WCNC 2004), 6 pages.

Hatami et al., "In-building Intruder Detection for WLAN Access," *IEEE Position Location and Navigation Symposium*, 2004. PLANS 2004, pp. 592-597. (Apr. 26-29, 2004).

Korba, "Security System for Wireless Local Area Networks," *Personal, Indoor and Mobile Radio Communications, 1998. The Ninth IEEE International Symposium*, Boston, MA USA, vol. 3, pp. 1550-1554 (Sep. 8, 1998-Sep. 11, 1998).

Lim et al., "Wireless Intrusion Detection and Response," *IEEE., Proceedings of the 2003 IEEE Workshop on Information Assurance United States Military Academy*, West Point, NY (Jun. 2003).

Roos et al., "A Probabilistic Approach to WLAN User Location Estimation", *International Journal of Wireless Information Networks*, vol. 9, No. 3, pp. 155-164(Jul. 2002).

Roos et al., "A Statistical Modeling Approach to Location Estimation," *IEEE Transactions on Mobile Computing*, vol. 1, No. 1, pp. 59-69 (Jan.-Mar. 2002).

Saha et al., "Location Determination of a Mobile Device using IEEE 802.11 Access Point Signals," *IEEE Wireless Communication and Networking Conference* (WCNC), (Mar. 2003).

Valenzuela, "A Ray Tracing Approach to Predicting Indoor Wireless Transmission," *43rd IEEE Vehicular Technology Conference*, pp. 214-218 (2003).

Youssef et al., "WLAN Location Determination via Clustering and Probability Distributions", *IEEE PerCom 2003*, 8 pages, (Mar. 2003).

Zhang et al., "Intrusion Detection Techniques for Mobile Wireless Networks," *Wireless Networks* vol. 9, No. 5, pp. 545-556 (Sep. 2003).

IBM extends its Wireless Security Auditor with more automatic features, Serverworld, Jun. 2002 (accessed Apr. 10, 2003).

IBM Research, Distributed Wireless Security Auditor, http://www.research.ibm.com/gsal/dwsa/, accessed Oct. 25, 2007.

IBM Research, Wireless Security Auditor (WSA), http://www.research.ibm.com/gsal/wsa/, accessed Oct. 25, 2007.

PR: IBM Debuts First Self-Diagnostic Wireless Security Tool on Linux, http://www.linuxtoday.com/infrastructure/2002061700826NWNT, alleged publication date: Jun 17, 2002, accessed Oct. 25, 2007.

Yeo et al.: "A Framework for Wireless LAN Monitoring and its Applications," Department of Computer Science, University of Maryland, College Park, MD 20742; Proceedings of the 2004 ACM workshop on wireless security; Publication date: Oct. 1, 2004; pp. 70-79.

Bellovin: "A Technique for Counting NATed Hosts", AT&T Labs Research, IMW02, Nov. 6-8, 2002, Marseille, France, pp. 267-272.

Wright "Detecting Wireless LAN MAC Address Spoofing", Jan. 21, 2003.

Source code of a wireless monitoring tool available on the Internet, http://svn.kismetwireless.net/code/tags/kismet-2004-10-R1/CHANGELOG, Jun. 9, 2004, 2 pgs.

Brian Moran: The hacker's wireless toolbox: part 2, COMPUTERWORLD, alleged Jul. 17, 2003, http://www.computerworld.com/mobiletopics/mobile/story/0,10801,83152,00.html.

Guo et al.: "Sequence Number-Based MAC Address Spoof Detection," in Proceedings of 8th International Symposium on Recent Advances in Intrusion Detection (RAID 2005), Sep. 2005, 20 pgs.

* cited by examiner

US 7,856,209 B1

METHOD AND SYSTEM FOR LOCATION ESTIMATION IN WIRELESS NETWORKS

CROSS-REFERENCES TO RELATED APPLICATIONS

This application is a continuation-in-part of U.S. patent application Ser. No. 10/966,353, filed on Oct. 15, 2004, entitled "METHOD AND SYSTEM FOR MONITORING A SELECTED REGION OF AN AIRSPACE ASSOCIATED WITH LOCAL AREA NETWORKS OF COMPUTING DEVICES," commonly assigned and hereby incorporated by reference for all purposes. Application Ser. No. 10/966,353 claims priority to the following eight U.S. provisional applications, commonly assigned, and hereby incorporated by reference herein.

1. U.S. Provisional Application No. 60/527,673, entitled "A system and a method for using of RF prediction data for securing wireless networks", filed on Dec. 8, 2003;

2. U.S. Provisional Application No. 60/569,024, entitled "A zero-configuration method and a distributed sensor based system for accurate location tracking in wireless networks", filed on May 7, 2004;

3. U.S. Provisional Application No. 60/607,897, entitled "Automated method and system for detecting unauthorized devices in wireless local area computer networks", filed on Sep. 8, 2004;

4. U.S. Provisional Application No. 60/607,812, entitled "Method and system for detecting masquerading wireless devices in local area computer networks", filed on Sep. 8, 2004;

5. U.S. Provisional Application No. 60/610,419, entitled "Method and system for preventing unauthorized connection of wireless access devices to local area computer networks", filed on Sep. 16, 2004; and 6. U.S. Provisional Application No. 60/610,417, entitled "Wireless network security exposure visualization and scenario analysis", filed on Sep. 16, 2004.

7. U.S. Provisional Application No. 60/543,631, entitled "Automated Method and an RF Sensor System for Wireless Unauthorized Transmission, Intrusion Detection and Prevention", filed on Feb. 11, 2004; and 8. U.S. Provisional Application No. 60/560,034, entitled "A Method And A System For Reliably Regulating, Disrupting And Preventing Access To The Wireless Medium Through Distributed Passive And Active Wireless Sensors", filed Apr. 6, 2004.

The present invention also relates to U.S. application Ser. No. 10/931,585, filed on Aug. 31, 2004 and U.S. application Ser. No. 10/931,926, filed on Aug. 31, 2004, commonly assigned, and each of which is hereby incorporated by reference for all purposes, each of which claims priority to U.S. Provisional Application No. 60/543,631, entitled "An Automated Method and an RF Sensor System for Wireless Unauthorized Transmission, Intrusion Detection and Prevention," filed Feb. 11, 2004, commonly assigned, and hereby incorporated by reference for all purposes. The present invention further relates to U.S. application Ser. No. 10/931,499, filed on Aug. 31, 2004, commonly assigned, and hereby incorporated by reference for all purposes, which claims priority to U.S. Provisional Application No. 60/560,034, entitled "A Method and a System for Reliably Regulating, Disrupting and Preventing Access to Wireless Medium Through Distributed Passive and Active Wireless Sniffers," filed on Apr. 6, 2004, commonly assigned, and hereby incorporated by reference for all purposes.

BACKGROUND OF THE INVENTION

This present invention relates generally to wireless computer networking techniques. More particularly, the invention provides a method and a system for estimating the physical location of wireless transmitters in wireless networks according to a specific embodiment. Preferably the wireless transmitters are associated with certain undesirable wireless activity such as denial of service attacks, spoofing, address forging and others. Merely by way of example, the invention has been applied to a computer networking environment based upon the IEEE 802.11 family of standards, commonly called "WiFi." But it would be recognized that the invention has a much broader range of applicability. For example, the invention can be applied to Ultra Wide Band ("UWB"), IEEE 802.16 commonly known as "WiMAX", cellular wireless networks such as CDMA, GSM, GPRS, and others.

Computer systems have proliferated from academic and specialized science applications to day to day business, commerce, information distribution and home applications. Such systems include personal computers, which are often called "PCs" for short, to large mainframe and server class computers. Powerful mainframe and server class computers run specialized applications for banks, small and large companies, e-commerce vendors, and governments. Smaller personal computers can be found in many if not all offices, homes, and even local coffee shops. These computers interconnect with each other through computer communication networks based on packet switching technology such as the Internet protocol or IP. The computer systems located within a specific local geographic area such as an office, home or other indoor and outdoor premises interconnect using a Local Area Network, commonly called, LAN. Ethernet is by far the most popular networking technology for LANs. The LANs interconnect with each other using a Wide Area Network called "WAN" such as the Internet.

While conventional computer networks have proliferated in the past, wireless communication technologies are currently increasing in popularity. That is, wireless communication technologies wirelessly connect users to the computer networks. Examples of wireless networks include, but are not limited to, wireless local area networks (WLAN) and cellular networks. One desirable application of wireless networks is to provide wireless access to the LAN in the office, the home, public hot-spots, and other geographical locations. As merely an example, the IEEE 802.11 family of standards, commonly called WiFi, is the common standard for such wireless applications. Among WiFi, the 802.11b standard-based WiFi often operates at the 2.4

GHz unlicensed radio frequency spectrum and offers wireless connectivity at speeds up to 11 Mbps. The 802.11g compliant WiFi offers even faster connectivity at about 54 Mbps and operates at the 2.4 GHz unlicensed radio frequency spectrum. The 802.11a standard provides speeds up to 54 Mbps operating in the 5 GHz unlicensed radio frequency spectrum. WiFi enables a quick and effective way of providing wireless extension to the existing LAN.

In order to provide wireless extension of the LAN using WiFi, one or more WiFi access points (APs) connect to the LAN connection ports either directly or through intermediate equipment such as a WiFi switch. A user can wirelessly connects to the LAN using a device equipped with a WiFi radio, commonly called a wireless station that communicates with the AP. The connection is free from cable and other physical encumbrances and allows the user to "Surf the Web," check e-mail, or use enterprise and e-commerce computer applications in an easy and efficient manner. Since access points have limited signal coverage, multiple access points may be required to provide signal coverage throughout a facility. Another advantage of wireless networks is that wireless stations can move throughout the signal coverage area and continue to connect to the computer network. In a typical operational wireless network, multiple wireless stations operate from different locations within the geographic area comprising the wireless network. Station locations may also change from time to time as the users carrying those devices move.

Determining the physical location of a wireless station, or that of a signal transmitting device, is useful for many applications, such as dispatching and location based applications. Physical location information regarding a wireless station is critical if said station either deliberately or unknowingly is causing harm to the wireless network in the form of a security breach, intrusion, performance degradation, and the like. Knowing the physical location of the wireless station in these scenarios enables the network administrator to track down the station and take action (e.g., remove it from the vicinity of the network) to avoid a security or performance catastrophe. However, location tracking capability is often not supported by standard WiFi communication systems and hence a location tracking solution is highly desirable.

Prior solutions have attempted to provide mechanisms to determine the physical location of a wireless station, with varying degrees of success. One conventional technique for location determination in local area wireless networking environments involves triangulating the position of the wireless station with respect to predetermined reference locations, based on signal strength measurements. A number of wireless access points or sniffers are provided at reference locations in the region of operation of the local area network. These access points or sniffer devices measure the received signal strength from the transmitting wireless station. The signal measurements of various access points or sniffer devices are collected at a server and the physical location of the station triangulated. Certain factors such as the layout of the region (e.g., walls, doors, roof, and other components that cause signal attenuation and/or reflection) and the statistical variability of the received signal strength can also be considered during triangulation.

Another conventional technique for location determination in local area wireless networking environments involves definition of areas within the geographic region of interest. A signal strength signature is then created for each area, representing the received signal strength measured at one or more network access points or sniffers and originating from the device transmitting from the area. During the operation, the area in which a transmitting wireless station resides is determined by comparing with the signal strength signature for various areas, the observed received signal strengths from the transmitting wireless station received at the network access points or sniffers. The comparison can be done via pattern matching.

These prior art techniques are not able to provide solutions for determining the physical location of wireless stations associated with certain undesirable wireless activities, such as certain denial of service (DOS) attacks, identity theft (e.g., spoofing), address forging, and the like. These and other limitations are described throughout the present invention. Accordingly, there is need in the art for techniques and systems for determining (estimating) the location of wireless stations associated with certain undesirable wireless activities.

SUMMARY OF THE INVENTION

According to the present invention techniques related to wireless computer networking are provided. More particularly, the invention provides a method and a system for estimating the physical location of wireless transmitters in wireless networks according to a specific embodiment. Preferably the wireless transmitters are associated with certain undesirable wireless activity such as denial of service attacks, spoofing, address forging and others. Merely by way of example, the invention has been applied to a computer networking environment based upon the IEEE 802.11 family of standards, commonly called "WiFi." But it would be recognized that the invention has a much broader range of applicability. For example, the invention can be applied to Ultra Wide Band ("UWB"), IEEE 802.16 commonly known as "WiMAX", cellular wireless networks such as CDMA, GSM, GPRS, and others.

According to a particular embodiment of the present invention, a method for estimating a location of a wireless device is provided. Preferably, the wireless device is associated with certain undesirable wireless activity, such as denial of service attacks, spoofing, address forging, and the like. The method includes disposing a plurality of sniffers in a geographic region. As merely an example, the geographic region can comprise office space, office floor, campus, commercial complex, portion of a street, and the like. The method also includes receiving a plurality of wireless signals at one or more of the plurality of sniffers. For example, the plurality of wireless signals are transmitted by one or more wireless devices within and/or in a vicinity of the geographic region.

The method further includes processing the plurality of wireless signals to identify a subset of the plurality of wireless signals that are associated with the wireless device whose location is to be estimated. In an embodiment, the wireless device provides one or more denial of service attacks. In these embodiments, the method includes processing the plurality of wireless signals to identify a subset of wireless signals that are associated with the denial of service attack. In another embodiment, the wireless device provides one or more identity theft attacks. In these embodiments, the method includes processing the plurality of wireless signals to identify a subset of wireless signals that are associated with the identity theft attack.

Moreover the method additionally includes determining a plurality of received signal strengths associated with the subset of the plurality of wireless signals. In an embodiment, determining the signal strengths includes measuring received signal strengths associated with the subset of wireless signals at one or more of the sniffers. Furthermore, the method includes providing an estimation of the location of the wireless device utilizing the determined received signal strengths associated with the subset of the plurality of wireless signals.

According to an embodiment of the present invention, a method of estimating a location of a wireless device is provided. According to embodiments of the present invention, the wireless device is providing a wireless attack. The method includes disposing a number of sniffers in a geographic region, receiving a number of wireless signals at one or more of the number of sniffers, and processing the number of wireless signals to identify a subset of the number of wireless signals that are associated with the wireless device. The method also includes determining a number of received signal strengths associated with the subset of the number of wireless signals and providing an estimation of the location of the wireless device utilizing the determined received signal strengths associated with the subset of the number of wireless signals.

According to another embodiment of the present invention, a method of estimating a location of a wireless device providing a denial of service attack in a wireless network is provided. The method includes positioning a number of sniffers in a geographic region, receiving a number of wireless signals at one or more of the number of sniffers, and processing one or more of the number of wireless signals to identify a set of wireless signals associated with the wireless device providing the denial of service attack. The method also includes determining a set of received signal strengths associated with the set of wireless signals and utilizing the set of determined received signal strengths to estimate the location of the wireless device providing the denial of service attack.

According to yet another embodiment of the present invention, a method of estimating a location of a spoofer wireless device is provided. The method includes receiving a number of wireless signals from a first wireless device and a second wireless device. In embodiments of the present invention, header information associated with the number of wireless signals indicates that the number of wireless signals are transmitted from a wireless device associated with a first MAC address. The method also includes obtaining a first frame from the number of wireless signals, estimating a first starting time for the first wireless device utilizing the first frame, and obtaining a second frame from the number of wireless signals. The method further includes estimating a second starting time for the second wireless device utilizing the second frame, According to embodiments of the present invention, the first starting time and the second starting time are unequal. Moreover, the method includes estimating a location of at least one of the first wireless device or the second wireless device.

According to an alternative embodiment of the present invention, a method of estimating a location of a MAC spoofing device in a wireless network is provided. The method includes receiving a number of 802.11 frames. In embodiments of the present invention, header information associated with the number of 802.11 frames indicates that the number of 802.11 frames are transmitted from a wireless device associated with a first MAC address. The method also includes processing a first frame from the number of 802.11 frames to compute an approximation to a starting time for a first wireless device associated with the first MAC address, storing the approximation to the starting time for the first wireless device in a location of a memory, and processing a second frame from the number of 802.11 frames to compute an approximation to a starting time for a second wireless device. According to embodiments of the present invention, the second wireless device is the MAC spoofing device. The method further includes storing the approximation to the starting time for the second wireless device in another location of the memory and estimating locations of the first wireless device and the second wireless device.

According to another alternative embodiment of the present invention, a method of estimating a location of a MAC spoofing device in a wireless network is provided. The method includes (a) receiving an 802.11 frame. In embodiments of the present invention, header information associated with the 802.11 frame indicates that the 802.11 frame is transmitted from a wireless device associated with a first MAC address. The method also includes (b) processing the 802.11 frame to compute an approximation to a starting time, (c) comparing the approximation to the starting time to one or more values in a list stored in a memory to ascertain the presence of a match, and (d) storing a received signal strength value in a memory location associated with one of the one or more values in the list if comparing the approximation to the starting time produced a match. The method further includes (e) appending the approximation to the starting time to the list if comparing the approximation to the starting time did not produce a match, (f) repeating steps (a) through (e) until the list comprises at least two starting time values, and (g) estimating a location for one or more wireless devices associated with the stored values.

According to yet another alternative embodiment of the present invention, a system for estimating a location of a wireless device is provided. In embodiments of the present invention, the wireless device is providing a wireless attack. The system includes a receiver adapted to receive a number of wireless signals at one or more of a number of sniffers. According to embodiments of the present invention, the number of sniffers are disposed in a geographic region. The system also includes a processor adapted to process the number of wireless signals to identify a subset of the number of wireless signals that are associated with the wireless device, determine a number of received signal strengths associated with the subset of the number of wireless signals, and provide an estimation of the location of the wireless device utilizing the determined received signal strengths associated with the subset of the number of wireless signals.

According to an exemplary embodiment of the present invention, a system for estimating a location of a wireless device providing a denial of service attack in a wireless network is provided. The system includes a receiver adapted to receive a number of wireless signals at one or more of a number of sniffers. In embodiments of the present invention, the number of sniffers are positioned in a geographic region. The system also includes a processor adapted to process one or more of the number of wireless signals to identify a set of wireless signals associated with the wireless device providing the denial of service attack, determine a set of received signal strengths associated with the set of wireless signals, and utilize the set of determined received signal strengths to estimate the location of the wireless device providing the denial of service attack.

According to another exemplary embodiment of the present invention, a system for estimating a location of a MAC spoofing device in a wireless network is provided. The system includes a receiver adapted to receive a number of 802.11 frames. In embodiments of the present invention, header information associated with the number of 802.11 frames indicates that the number of 802.11 frames are transmitted from a wireless device associated with a first MAC address. The system also includes a processor adapted to process a first frame from the number of 802.11 frames to compute an approximation to a starting time for a first wireless device associated with the first MAC address. The system further includes memory adapted to store the approximation to the starting time for the first wireless device in a location of the memory. The system processor is also adapted to process a second frame from the number of 802.11 frames to compute an approximation to a starting time for a second wireless device. According to embodiments of the present invention, the second wireless device is the MAC spoofing device. The system memory is also adapted to store the approximation to the starting time for the second wireless device in another location of the memory. Moreover, the system processor is adapted to estimate locations of the first wireless device and the second wireless device.

Certain advantages and/or benefits may be achieved using the present invention. For example, the technique of the invention provides an easy to use process that relies upon conventional computer hardware and software technologies. In some embodiments, the technique of the invention facilitates location tracking of wireless devices associated with undesirable wireless activities. In an embodiment, location estimation is facilitated even when the attacker device frequently changes its identity (e.g., sends messages from varying MAC addresses). In another embodiment, location estimation is facilitated even the attacker device assumes (spoofs) the identity (e.g., MAC address) of another device. Depending upon the embodiment, one or more of these benefits may be achieved. These and other benefits will be described in more detail throughout the present specification and more particularly below.

Various additional objects, features and advantages of the present invention can be more fully appreciated with reference to the detailed description and accompanying drawings that follow.

DETAILED DESCRIPTION OF SPECIFIC EMBODIMENTS

According to the present invention techniques related to wireless computer networking are provided. More particularly, the invention provides a method and a system for estimating the physical location of wireless transmitters in wireless networks according to a specific embodiment. Preferably the wireless transmitters are associated with certain undesirable wireless activity such as denial of service attacks, spoofing, address forging and others. Merely by way of example, the invention has been applied to a computer networking environment based upon the IEEE 802.11 family of standards, commonly called "WiFi." But it would be recognized that the invention has a much broader range of applicability. For example, the invention can be applied to Ultra Wide Band ("UWB"), IEEE 802.16 commonly known as "WiMAX", cellular wireless networks such as CDMA, GSM, GPRS, and others.

The following description refers to a number of system diagrams and processes. These diagrams are merely illustrations, which should not unduly limit the scope of the claims. One of ordinary skill in the art would recognize many variations, alternatives, and modifications. Although embodiments of the present invention will be described using a selected group of systems, there can be many alternatives, modifications, and variations. For example, some of the systems may be expanded and/or combined. Other systems may be inserted to those specifically noted. Depending upon the embodiment, the specific systems may be interchanged with others replaced. Further details of these elements are found throughout the present specification.

Similarly, although some embodiments will be described using a selected sequence of processes, there can be many alternatives, modifications, and variations. For example, some of the processes may be expanded and/or combined. Other processes may be inserted to those specifically noted. Depending upon the embodiment, the specific sequence of steps may be interchanged with others replaced. Further details of these processes and steps are found throughout the present specification.

Figure 1:
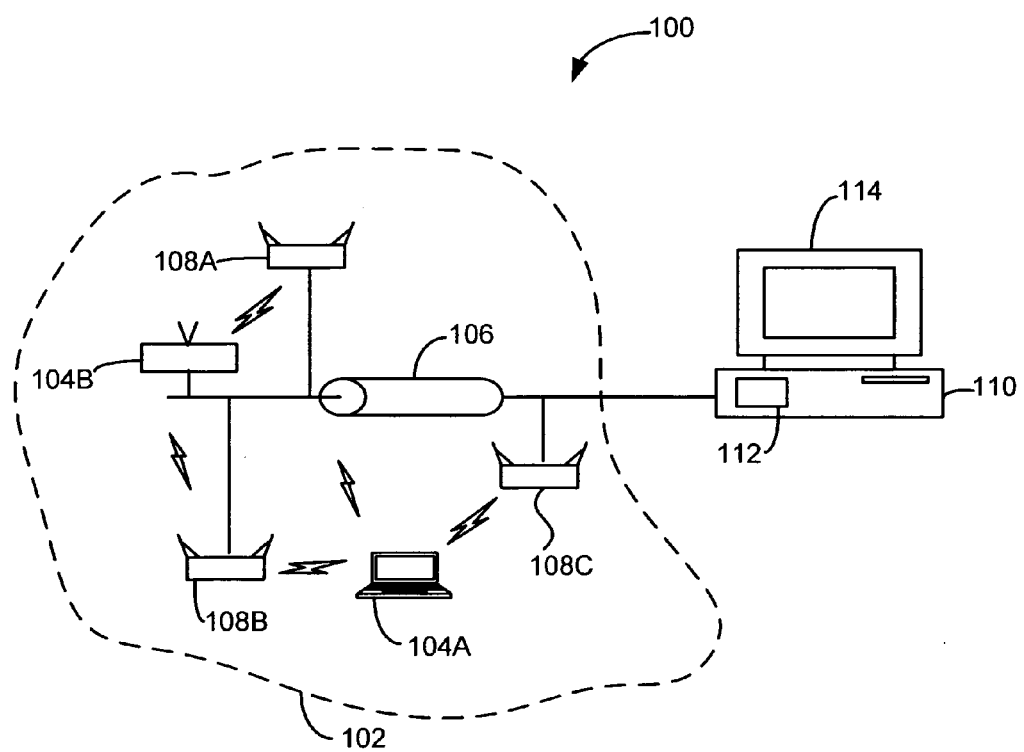
FIG. 1 is a simplified illustration of a conventional system for performing location estimation in wireless networks.

FIG. 1 is a simplified illustration of a conventional system for performing location estimation in wireless networks. This diagram is merely an example, which should not unduly limit the scope of the claims herein. One of ordinary skill in the art would recognize many variations, alternatives, and modifications. The selected geographic region 102 can be any indoor and/or outdoor region within which it is desirable to locate a transmitting wireless station. The transmitting wireless station can be a wireless access point that is connected (e.g., 104B) or unconnected (not shown) to the local area network 106, a laptop (e.g., 104A), a PDA, a mobile phone, and like. The transmitting wireless station, whether an access point (connected or unconnected to the local area network 106) or a client such as a laptop, a PDA, a mobile phone, etc., is generically referred to herein as transmitting wireless station 104. Merely as an example, the selected geographic region can comprise one or more floors, buildings, or premises of an office, a commercial facility, a warehouse, an apartment, a hot-spot, and the like. Preferably, the selected geographic region also comprises at least a portion of computer network 106. The computer network 106 can be any suitable network such as a local area network, a wide area network, or any combination of these. In one specific embodiment, the computer network is a local area network based on Ethernet technology. One or more RF sensor/signal detection devices (e.g., sensor devices 108A, 108B and 108C, each generically referred to herein as a sniffer 108) are spatially disposed within or in a selected vicinity of the selected geographic region 102. Preferably, the sniffers 108 are provided at reference locations within or in the selected vicinity of the selected geographic region 102.

In general, sniffer 108 can listen to a radio channel and capture transmissions on that channel. In one embodiment, sniffer 108 can cycle through multiple radio channels on which wireless communication could take place. On each radio channel, sniffer 108 can wait and listen for any ongoing transmission. In one embodiment, sniffer 108 can operate on multiple radio channels simultaneously.

Whenever a transmission is detected, sniffer 108 can collect and record the relevant information about that transmission. According to a specific embodiment, the recorded information includes, but is not limited to, packet type, information derived from various fields in the packet, source identity, destination identity, and strength of the received signal associated with the transmission. Information such as the day or the time of the day when the transmission was detected may also be recorded. In a particular embodiment, sniffer 108 is coupled to the computer network 106 using its Ethernet network interface. In an alternative embodiment, the sniffer is coupled to the computer network 106 over a wireless connection.

In one embodiment, sniffer 108 can be any suitable receiving device capable of detecting wireless activity. To provide the desired detection and recording functionality, sniffer 108 can have a processor, a flash memory, where the software code for sniffer functionality resides, a RAM, which serves as volatile memory during program execution, one or more 802.11a/b/g wireless network interface cards (NICs), which perform radio and wireless MAC layer functionality, one or more (i.e. for radio diversity) dual-band (for transmission detection in both the 2.4 GHz and 5 GHz radio frequency spectrums) antennas coupled to the wireless NICs, an Ethernet MC which performs Ethernet physical and MAC layer functions, an Ethernet jack, such as a RJ-45 socket, coupled to the Ethernet MC for connecting the sniffer device to wired LAN with optional power over Ethernet or POE, a serial port, which can be used to flash/configure/troubleshoot the sniffer device, and a power input. One or more light emitting diodes (LEDs) can be provided on the sniffer device to convey visual indications such as, for example, device working properly, error condition, unauthorized wireless activity alert, and so on.

In one embodiment, sniffer 108 can be built using a hardware platform similar to that used to build an AP, although having different functionality and software. In one embodiment, to more unobtrusively be incorporated in the selected geographic region, sniffer 108 could have a small form factor. In one embodiment, a sniffer 108 could also be provided with a radio transmit interface, thereby allowing sniffer 108 to generate interference with a suspected intruder's transmission or to transmit test signals.

The sniffer conveys the information derived from the detected wireless activity to processing system 110, over one or more computer networks 106. According to a specific embodiment, the processing system comprises software run on a PC, an appliance, or a server computer. The processing system 110 may be physically located within the selected geographic region, in the vicinity of it, or at a remote location. The processing system can comprise codes 112 directed to perform various functions in accordance with the method of present invention and a display device 114 (e.g., a computer screen).

In order to locate a transmitting wireless station 104, one or more of the sniffers 108 measure the strength of radio signals emanating from the wireless station and report their measurements to the processing system 110. In a specific embodiment, the radio signals are associated with packets in the IEEE 802.11 format (also called 802.11 frames) that are transmitted from the station 104. For example, the packets are transmitted from the station 104 to one or more other stations (such as wireless access points, wireless laptops, PDAs and so on) in the wireless network. According to a specific embodiment, the packets that are transmitted from the station 104 are identified from other wireless packets by examining the source MAC address in the packets detected on the wireless medium. If the source MAC address in the packet is the MAC address of the wireless station 104, the packet is considered to be transmitted by the station 104.

The processing system 110 collects signal strength measurements associated with transmissions from station 104 from one or more of the sniffers 108. Based on these measurements and the known reference locations of the one or more sniffers, the processing system 110 can compute (e.g., estimate) the physical location of the station 104. For example, a triangulation method can be used to compute the physical location. Preferably, the estimated physical location can be a point location, an area location within which the station is estimated to reside, or a volume location within which the station is estimated to reside. The estimated physical location can be displayed on the display device 114, preferably in relation to the layout of the selected geographic region.

This conventional technique suffers from several limitations which have been identified by the present applicants. For example, it is often desirable to locate wireless stations that are associated with undesirable wireless activity, such as security breaches or performance intrusions. Tracking the location of such devices can facilitate the system administrator in taking a variety of remedial actions. The conventional techniques fail to provide location estimation of wireless stations associated with certain denial of service (DOS) attacks, certain identity theft attacks (e.g., MAC spoofing), certain address forging attacks, and the like.

These limitations are illustrated by way of example in relation to FIGS. 2A-2D, and are described throughout the present invention and more particularly below. These diagrams are merely examples, which should not unduly limit the scope of the claims herein. One of ordinary skill in the art would recognize many variations, alternatives, and modifications.

Figure 2A:
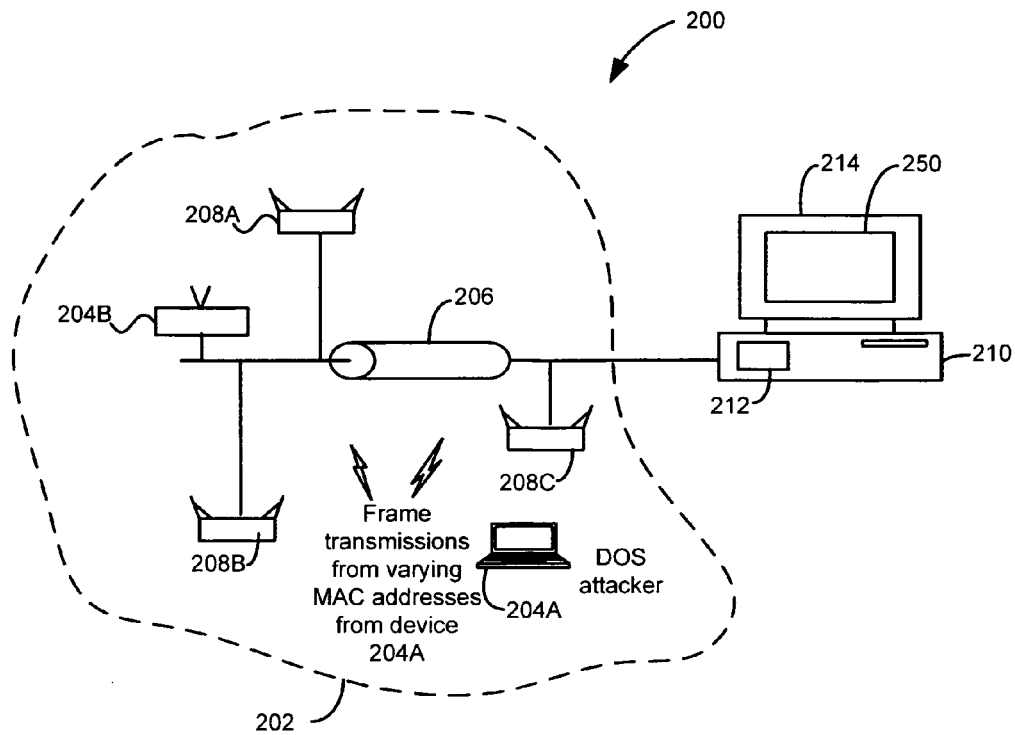
FIG. 2A is a simplified illustration of a wireless network under a denial of service attack.

FIG. 2A is a simplified illustration of a wireless network under a denial of service attack. As illustrated in FIG. 2A, the wireless station 204A is associated with a certain wireless denial of service (DOS) attack on the network 206. For example, the DOS attack can be an association flood attack, an authentication flood attack, an EAPOL start flood attack, and the like. As merely an example, the attack can be launched on the authorized access point 204B.

In these DOS attacks, the attacker station 204A sends a number of connection requests (e.g., authentication requests, association requests, EAPOL start requests, etc.) to the access point 204B to overwhelm the computing resources (e.g., memory, processing power, etc.) in the access point. This renders the access point unusable to service legitimate connection requests. Notably, the attacker device 204A often sends these connection requests from random or varying source MAC addresses. This renders conventional techniques unusable to track the location of attacker device 204A. Merely as an example, suppose that for statistical stability 100 samples of received signal strength (e.g., signal strength measurements from 100 frames) from the transmitting wireless station are needed for location estimation. Suppose that the device 204A transmits 1000 connection requests, each with a different source MAC address. Clearly the conventional technique will not be able to locate this device for want of 100 samples (e.g., frames) transmitted from the device 204A from any one MAC address.

Figure 2B:
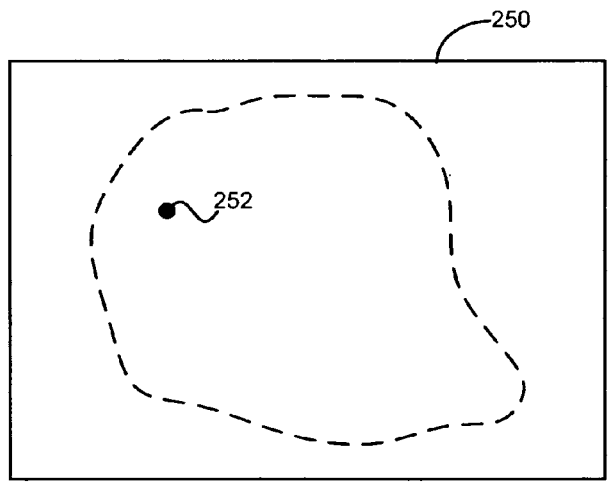
FIG. 2B is a simplified screen shot illustrating a display of estimated locations during a denial of service attack using a conventional system.

FIG. 2B is a simplified screen shot illustrating a display of estimated locations during a denial of service attack using a conventional system. For purposes of illustration, the screen dimensions are illustrated by square rectangle 250. The real location 252 of the wireless station 204B is illustrated by a dot on the screen 250. As illustrated in FIG. 2B, using the conventional system illustrated in FIG. 2A, the estimated location of the DOS attacker 204A is not available and therefore, is not illustrated at any location on screen 250.

Figure 2C:
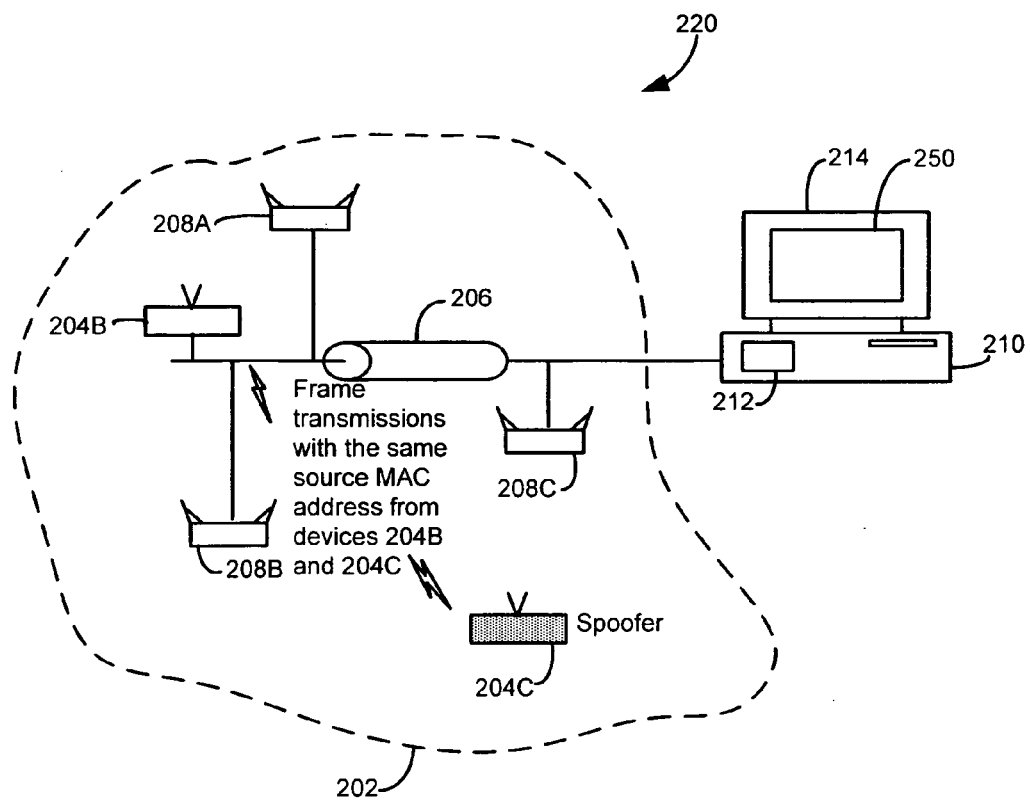
FIG. 2C is a simplified illustration of a wireless network under an identity theft attack.

FIG. 2C is a simplified illustration of a wireless network under an identity theft attack. As illustrated in FIG. 2C, the wireless station 204C is associated with a certain identity threat (e.g., MAC spoofing attack). In particular, the station 204C advertises the same identity information (e.g., MAC address, SSID, and other characteristics) as that of the authorized access point 204B in order to evade detection and engage is surreptitious hacking activities. In the conventional technique, the received signal strengths measured by the sniffers from the frames transmitted by both the authorized access point 204B and the spoofer device 204C can average out (as all these frames appear to have been transmitted from the same MAC address, e.g., the MAC address of the access point 204B). This results in inaccurate location estimation as illustrated below.

In an alternative embodiment, the wireless station 204C can further provide DOS attacks such as deauthentication attack, disassociation attack and the like. For example, in the deauthentication attack, the station 204C spoofs the identity (e.g., MAC address) of the authorized AP 204B and transmits deauthentication messages on the wireless medium. This can disrupt connections of the legitimate clients connected to the AP 204B.

Figure 2D:
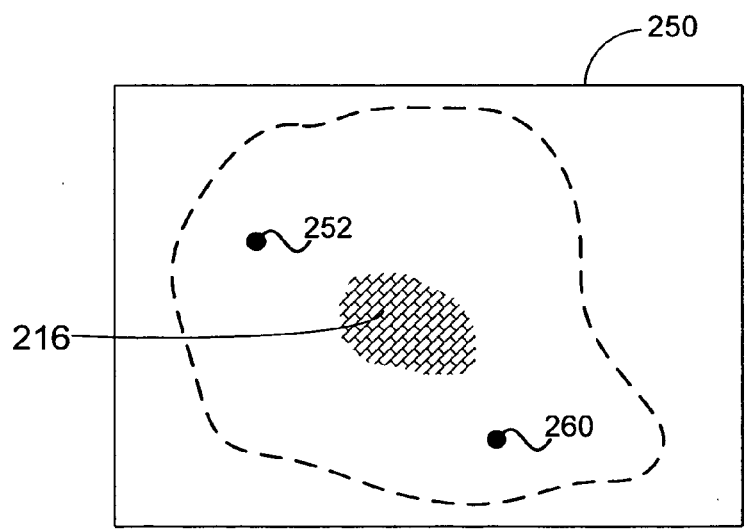
FIG. 2D is a simplified screen shot illustrating a display of estimated locations during an identity theft attack using a conventional system.

FIG. 2D is a simplified screen shot illustrating a display of estimated locations during an identity theft attack using a conventional system. For purposes of illustration, the screen dimensions are illustrated by square rectangle 250. The real location 252 of the wireless station 204B is illustrated by a dot on the screen 250. The estimated location of the station 204C is illustrated on the screen by estimated location area 216. As further illustrated in FIG. 2D, using the conventional system illustrated in FIG. 2C, the estimated location 216 of the DOS attacker 204A does not include the real location 260 of the DOS attacker 204A. Therefore, using conventional techniques, the system is not able to accurately display the estimated location of the attacker.

Embodiments of the present invention provide location tracking systems and techniques that overcome these and other limitations we have observed in relation to conventional techniques. As described more fully below, embodiments of the present invention facilitate the location estimation of wireless stations associated with certain denial of service (DOS) attacks, certain identity theft attacks (e.g., MAC spoofing), certain address forging attacks, and the like.

Figure 3:
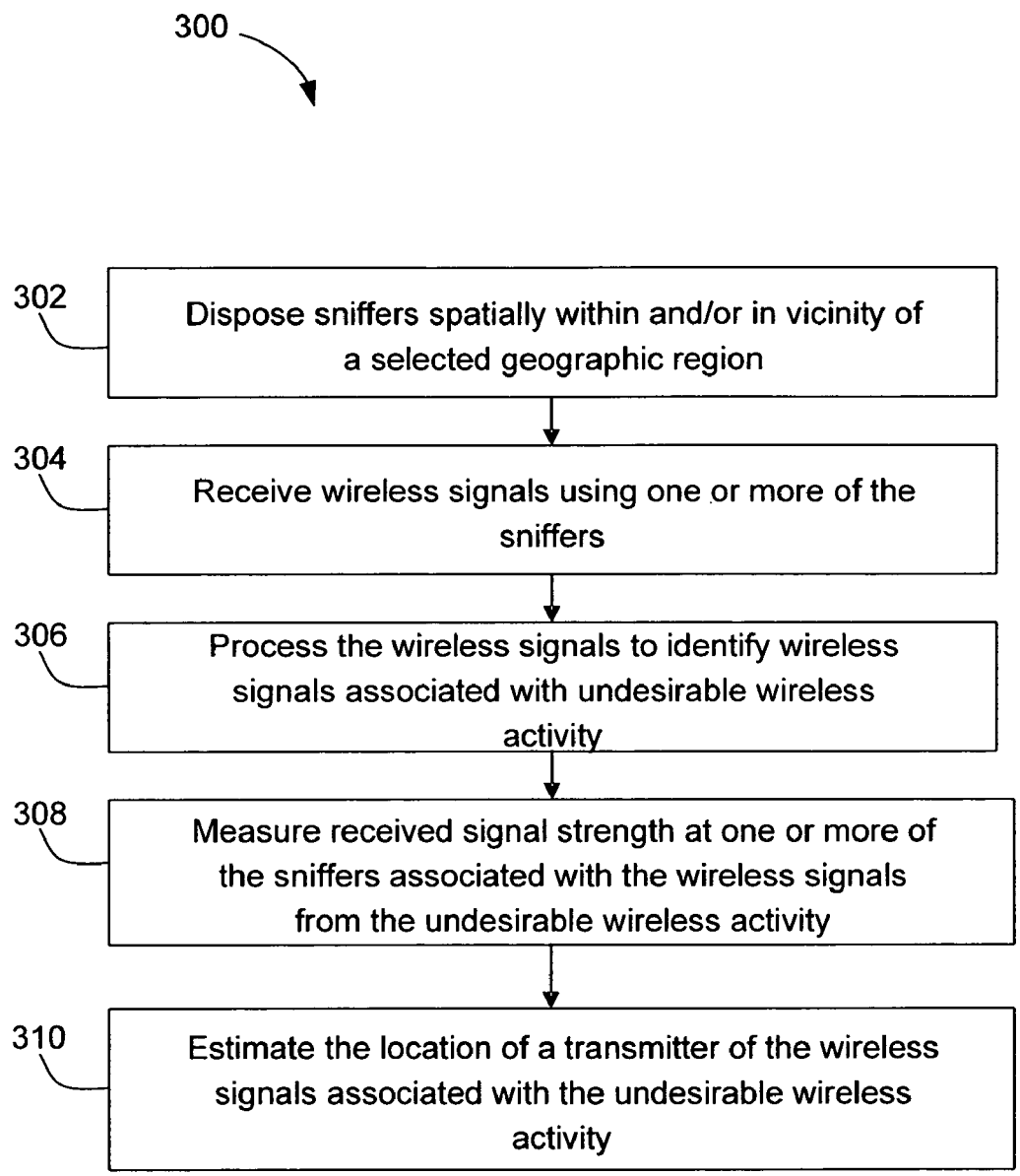
FIG. 3 is a simplified flowchart illustrating a method for estimating wireless station location according to an embodiment of the invention.

FIG. 3 is a simplified flowchart illustrating a method for estimating wireless station location according to an embodiment of the invention. This diagram is merely an example, which should not unduly limit the scope of the claims herein. One of ordinary skill in the art would recognize many variations, alternatives, and modifications. The method can be implemented using sniffers 108 and processing system 110.

One or more sniffers 108 are spatially disposed (302) within and/or in the vicinity of a selected geographic region over which it is desirable to estimate the location of a wireless station. Preferably the wireless station is associated with undesirable wireless activity, such as certain denial of service (DOS) attacks (e.g., association flood, authentication flood, EAPOL start flood, etc.), certain identity theft attacks (e.g., MAC spoofing, deauthentication attack, disassociation attack), certain address forging attacks, and the like.

The sniffers receive wireless signals transmitted over wireless medium within at least a portion of the selected geographic region (304). Preferably, the wireless signals include wireless signals transmitted by the wireless station that is associated with the undesirable wireless activity. At least a subset of the received wireless signals are processed (306) to identify a subset of the received wireless signals that are associated with the undesirable wireless activity. The received signal strength (e.g., received at one or more of the sniffers) associated with the wireless signals from the undesirable wireless activity is measured (308).

The location of a transmitter of the wireless signals associated with the undesirable wireless activity is estimated (310) based on the received signal strength measurements associated with the wireless signals from the undesirable wireless activity. For example, a triangulation technique can be used for location estimation.

A specific embodiment of the method illustrated in FIG. 3 estimates the location of a wireless station associated with a certain DOS attack, such as an association flood attack, an authentication flood attack, an EAPOL start flood attack, and the like. For example, suppose that a wireless station is associated with an authentication flood attack. In this attack, the wireless station sends a flood of authentication requests to an AP from varying MAC addresses. Referring to step 306 in FIG. 3, embodiments of the present invention identify wireless signals that are associated with authentication requests. As merely an example, 802.11 authentication request messages to the victim AP's MAC address are identified. The received signal strength of the identified authentication requests is measured by one or more of the sniffers. Based on the received signal strength measurements, the location of the wireless station associated with the attack is estimated.

Figure 4A:
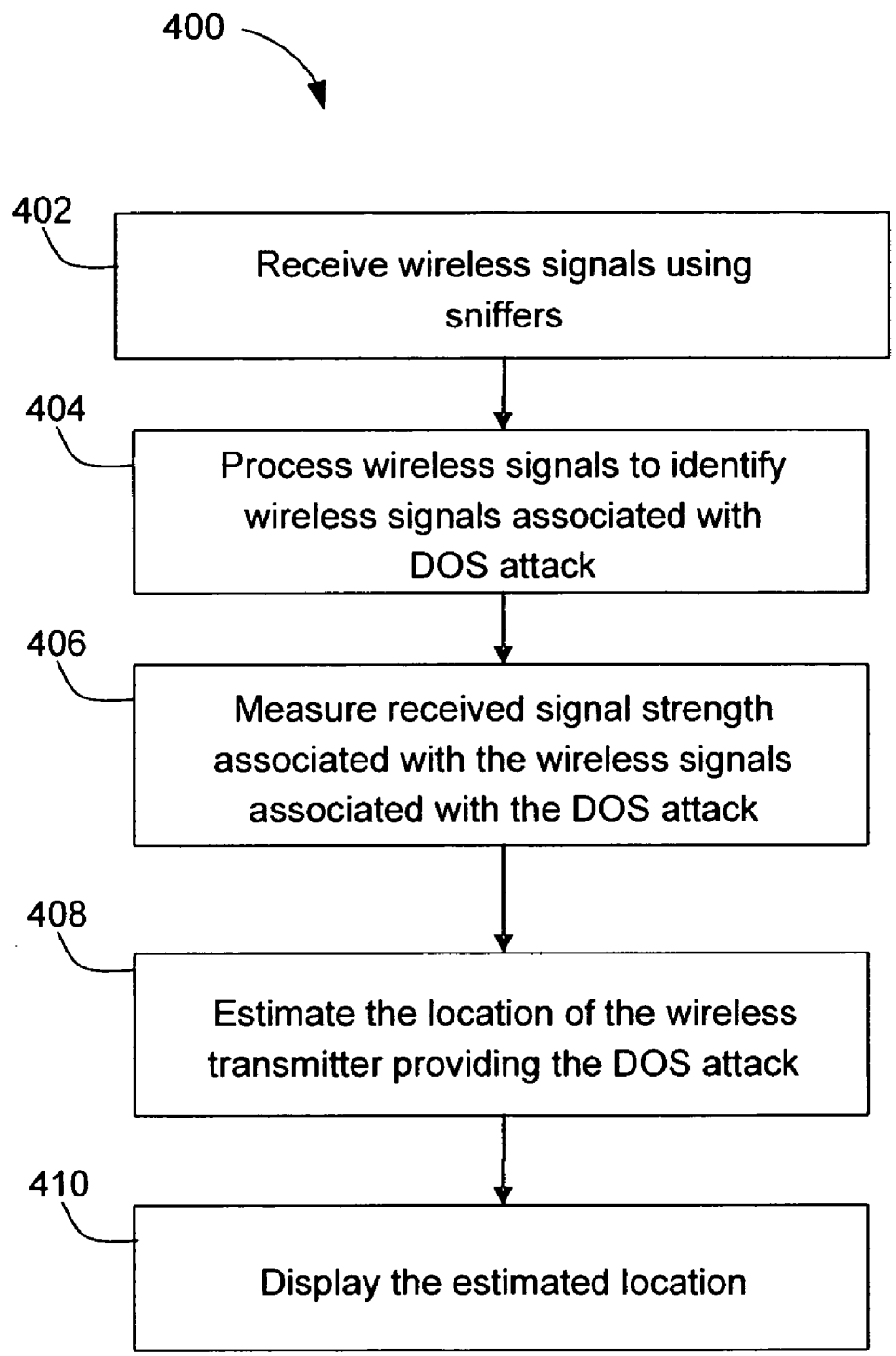
FIG. 4A is a simplified flowchart illustrating a method for estimating wireless station location during a denial of service attack according to an embodiment of the invention.

FIG. 4A is a simplified flowchart illustrating a method for estimating wireless station location during a denial of service attack according to an embodiment of the invention. This diagram is merely an example, which should not unduly limit the scope of the claims herein. One of ordinary skill in the art would recognize many variations, alternatives, and modifications. As illustrated in FIG. 4, wireless signals are received (402) using sniffers. The wireless signals are processed (404) to identify wireless signals associated with the DOS attack. In an embodiment, the wireless signals associated with the DOS attack are identified using one or more signatures of the DOS attack. As merely an example, the DOS attack includes an association flood attack. In this embodiment, step 404 can detect that the DOS attack is in progress. In one embodiment, the detection can be based on the number of association requests to a victim access point from varying MAC addresses being more than a predetermined threshold. In this embodiment, step 404 can further identify wireless signals associated with the DOS attack by filtering out from the received 802.11 frames those frames which indicate association requests to the victim access point's MAC address.

As another example, the DOS attack includes a broadcast deauthentication attack. In the broadcast deauthentication attack, an attacker device sends broadcast deauthentication messages over the wireless medium by spoofing the MAC address of a victim AP. This can disrupt wireless connections between the victim AP and wireless clients connected to it. In an embodiment, the detection of the deauthentication DOS attack is based on the number of broadcast deauthentication messages from the victim access point being more than a predetermined threshold. In this embodiment, step 404 can further identify wireless signals associated with the DOS attack by filtering those frames which indicate association requests to the victim access point's MAC address from the received 802.11 frames.

In an alternative embodiment, the detection of the deauthentication DOS attack can be based on detection of MAC spoofing of the victim access point. In this embodiment, step 404 can further identify wireless signals associated with the DOS attack by filtering out beacon or probe response frames that are transmitted by the attacker device from the received 802.11 frames. Notably, the beacon/probe response frames transmitted by the attacker device and beacon/probe response frames by the victim device include identical transmitter identity (e.g., MAC address) information. Techniques for detection of MAC spoofing and separation of beacon/probe response frames transmitted from the attacker device are described more particularly below.

As yet another example, the DOS attack includes a unicast deauthentication attack. In the unicast deauthentication attack, an attacker device can send deauthentication messages over the wireless medium by spoofing the MAC address of a victim AP. The messages are addressed to the MAC address of a victim wireless client. Alternatively, the attacker device can send deauthentication messages over the wireless medium by spoofing the MAC address of the victim wireless client. The messages are addressed to the MAC address of the victim access point. In an embodiment, the detection is based on the number of unicast deauthentication messages from the victim access point to the victim wireless client or vice versa being more than a predetermined threshold and the detection of MAC spoofing of either or both of the victim access point and the victim wireless client. In this embodiment, step 404 can further identify wireless signals associated with the DOS attack by filtering those frames which indicate deauthentication messages from the victim access point's MAC address to the victim wireless client's MAC address or vice versa from the received 802.11 frames.

The received signal strength associated with the wireless signals associated with the DOS attack is measured by one or more sniffers (406). In an embodiment, the sniffers report the received signal strength or information associated with the received signal strength to the processing unit 110. Based on the measured received signal strength, location estimation is performed (408). The estimated location determined using the method described with respect to FIG. 4A can be shown on a display device 214 as illustrated in FIG. 4B (e.g., in relation to the layout of the selected geographic region) as coordinates, a location area, a location volume, and the like (410).

Figure 4B:
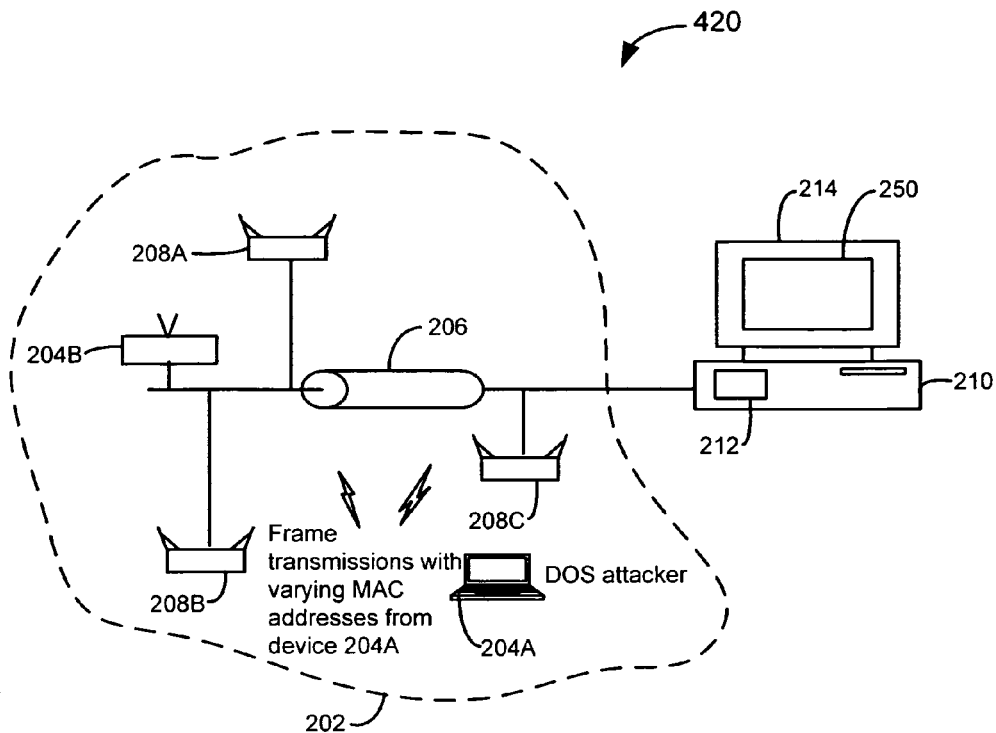
FIG. 4B is a simplified illustration of a system for performing location estimation in wireless networks during a denial of service attack according to an embodiment of the present invention.

FIG. 4B is a simplified illustration of a system for performing location estimation in wireless networks during a denial of service attack according to an embodiment of the present invention. As illustrated in FIG. 4B, DOS attacker 204A launches a DOS attack (e.g., an association flood attack) on the network. Using embodiments of the present invention, the estimated location of the DOS attacker is indicated on display device 214, which is used in conjunction with processing system 210, which may be physically located within the selected geographic region 420, in the vicinity of it, or at a remote location. The processing system comprises codes 212 directed to perform various functions in accordance with the method of present invention and a display device 214 (e.g., a computer screen).

Figure 4C:
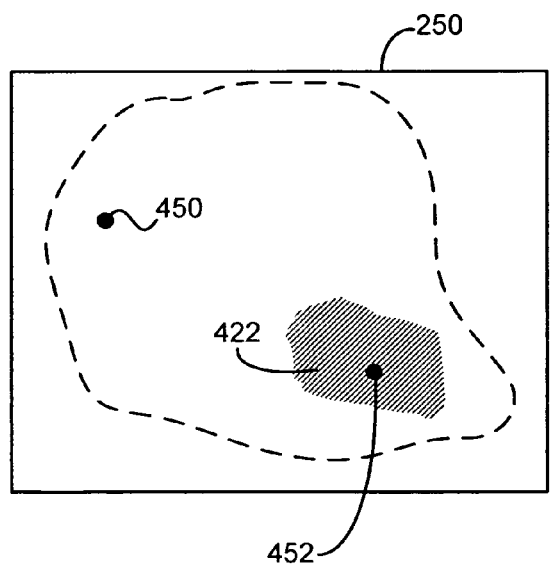
FIG. 4C is a simplified screen shot illustrating the display of estimated locations during a denial of service attack according to an embodiment of the present invention.

FIG. 4C is a simplified screen shot illustrating the display of estimated locations during a denial of service attack according to an embodiment of the present invention. Referring to FIG. 4C, embodiments of the present invention provide for display of the estimated location of various wireless stations on display device 214. For purposes of illustration, the screen dimensions are illustrated by square rectangle 250. For example, the real location 450 of wireless station 204B is illustrated in FIG. 4C. Additionally, the estimated location of the DOS attacker 204A is indicated by location region 422. Preferably, the location region 422 includes or is substantially close to the actual location 452 of the DOS attacker 204A. In the illustration shown in FIG. 4C, the actual location 452 is contained within the estimated location 422. Although not illustrated in FIG. 4C, other reference locations (e.g., locations of sniffers 208, locations of layout components such as walls, rooms, elevator, passages and the like) are displayed according to embodiments of the present invention. One of ordinary skill in the art would recognize many variations, modifications, and alternatives.

Figure 5A:
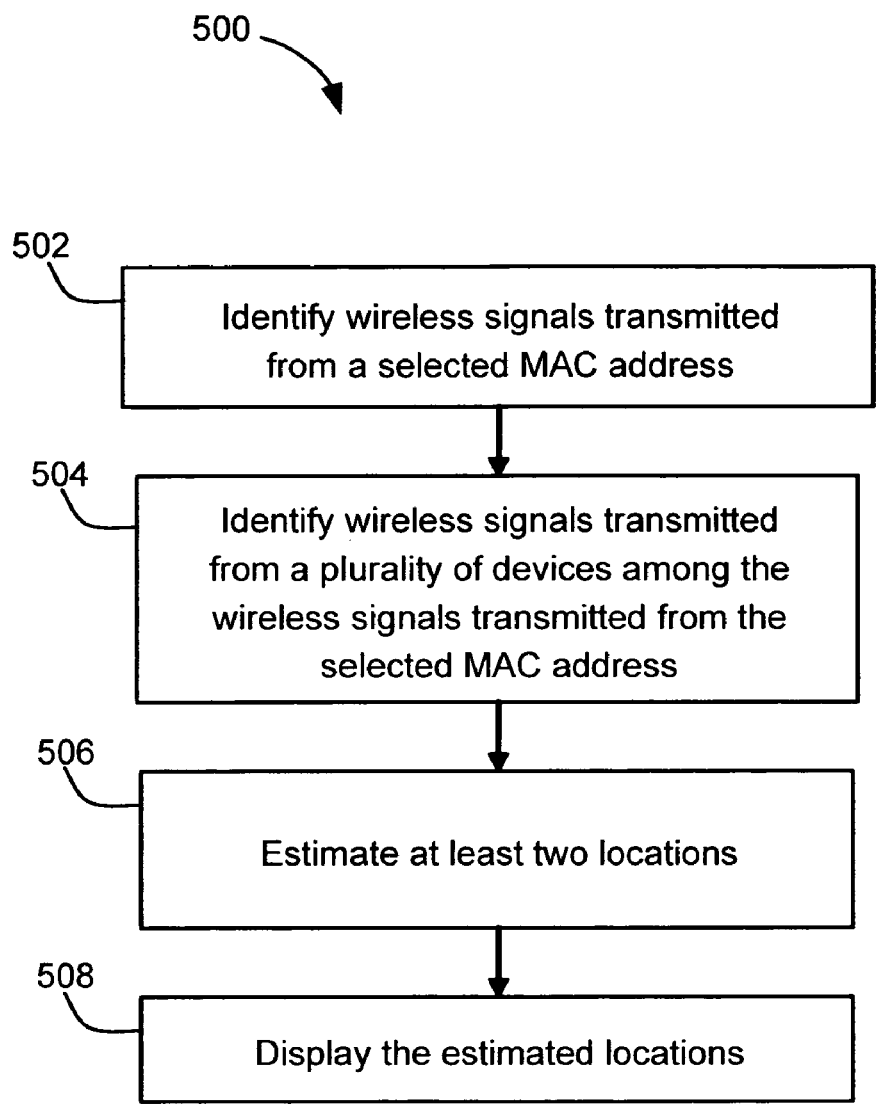
FIG. 5A is a simplified flowchart illustrating a method for estimating wireless station location during an identity theft attack according to an embodiment of the invention.

Another specific embodiment of the methods and systems of the present invention estimates the location of a wireless station associated with a certain identity theft (e.g., MAC spoofing) attack. FIG. 5A is a simplified flowchart illustrating a method for estimating wireless station location during an identity theft attack according to an embodiment of the invention. This diagram is merely an example, which should not unduly limit the scope of the claims herein. One of ordinary skill in the art would recognize many variations, alternatives, and modifications.

In a MAC spoofing attack, one or more wireless stations advertise identity information (e.g., a MAC address) that is similar to that of an authorized AP (referred to as a "victim AP") in order to evade detection and engage in surreptitious hacking activities. In the embodiment illustrated in FIG. 5A, wireless signals transmitted from a selected MAC address (e.g., the MAC address of the victim AP that is being spoofed by one or more wireless stations) are identified (502). Moreover, among these wireless signals, wireless signals transmitted from different devices (e.g., the victim AP device and one or more spoofer devices) are identified (504).

In a particular embodiment of the method illustrated in FIG. 5A, the process of identifying wireless signals from a selected MAC address (502) includes identifying the 802.11 style frames transmitted from the selected MAC address using the transmitter MAC address field in the frames. Notably, these frames constitute frames transmitted from the victim AP as well as frames transmitted from the one or more spoofer devices. The frames transmitted from different devices are identified (504) through analysis of one or more characteristics (e.g., values of certain fields in the frames, such as the TSF field and the sequence number field, received signal strength, etc.) associated with the frames.

In a specific embodiment, the frames transmitted from different devices are identified (504) by capturing beacon frames or probe response frames transmitted from the selected MAC address (e.g., the MAC address as provided in the source address or the BSSID field in the beacon/probe response frame), and recording values contained in the TSF field of the captured beacon/probe response frames. The TSF is a 64-bit field in the IEEE 802.11 beacon/probe response frame that contains an AP's timestamp. The TSF counter starts from zero every time the AP device is started, i.e., when the AP device is reset, restarted, rebooted, powered on, and like. The TSF value has units of microseconds and increments as a function of time.

Embodiments of the present invention utilize the TSF field by computing an approximation to the starting time (i.e. most recent starting time) of the AP device with a given MAC address from the TSF value contained in the captured beacon frame or probe response frame. For example, the starting time can be computed by subtracting the TSF value from the time the beacon packet from a given MAC address is captured. If there were a number of AP devices transmitting beacon packets with the given MAC address, it is unlikely that they were started at exactly the same time instant. Subsequently, different values for AP starting time approximation will be obtained and MAC spoofing can be detected. The frames (e.g., beacon and probe response) transmitted by the different devices can be identified using the starting times computed from the TSF associated with them.

As merely an example, suppose that $F_1$, $F_2$, $F_3$, $F_4$, and $F_5$ are the beacon frames detected by the sniffer and that all have the same transmitter MAC address in them. Suppose, the AP starting time approximation associated with the frames $F_1$, $F_2$, and $F_4$ is $t_1$, and the AP starting time approximation associated with the frames $F_3$ and $F_5$ is $t_2$. Preferably, $t_1$ and $t_2$ are not equal to each other (e.g., considering certain margin for error). Then the frames $F_1$, $F_2$, and $F_4$ can be inferred to be transmitted from one device (a first transmitter) and the frames $F_3$ and $F_5$ can be inferred to be transmitted from the other device (a second transmitter).

Referring to FIG. 5A, at least two locations (e.g., coordinates, location regions, location volumes, etc.) are estimated (506), one based on the received signal strength associated with the wireless signals from the first transmitter device measured by one or more sniffers, and another based on the received signal strength associated with the wireless signals from the second transmitter device measured by one or more sniffers. For example, one location estimation is done using the received signal strength associated with frames $F_1$, $F_2$, and $F_4$ measured by one or more sniffers. The other location estimation is performed using the received signal strength associated with frames $F_3$ and $F_5$ measured by one or more sniffers.

Figure 5B:
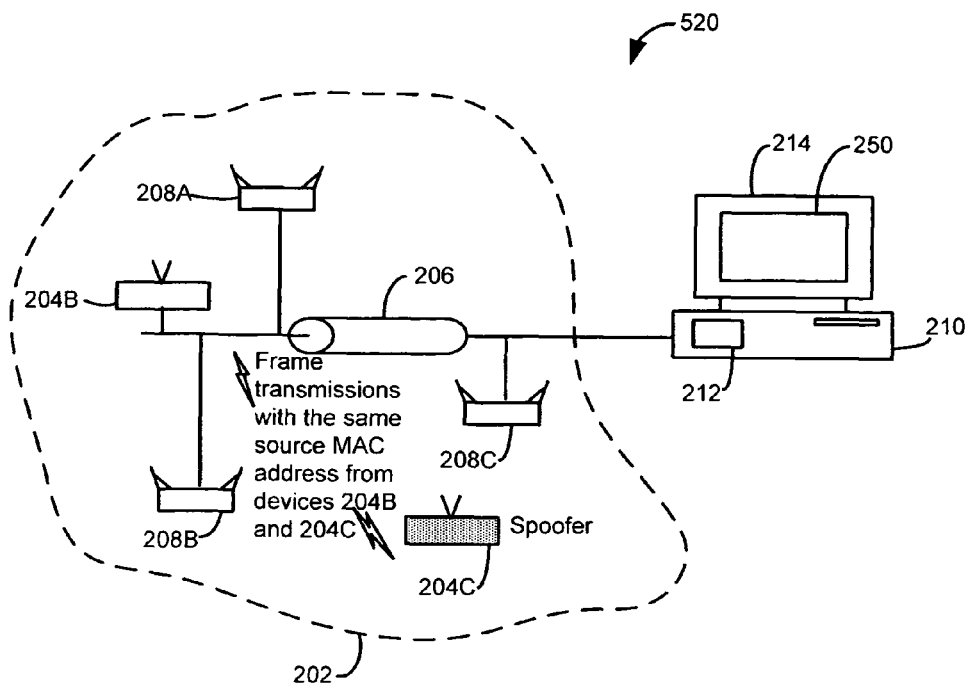
FIG. 5B is a simplified illustration of a system for performing location estimation in wireless networks during an identity theft attack according to an embodiment of the present invention.

FIG. 5B is a simplified illustration of a system for performing location estimation in wireless networks during an identity theft attack according to an embodiment of the present invention. As illustrated in FIG. 5B, spoofer 204C launches an identity theft attack on the network. Using embodiments of the present invention, the estimated location of the spoofer is indicated on display device 214, which is used in conjunction with processing system 210, which may be physically located within the selected geographic region 520, in the vicinity of it, or at a remote location. The processing system comprises codes 212 directed to perform various functions in accordance with the method of present invention and a display device 214 (e.g., a computer screen).

Figure 5C:
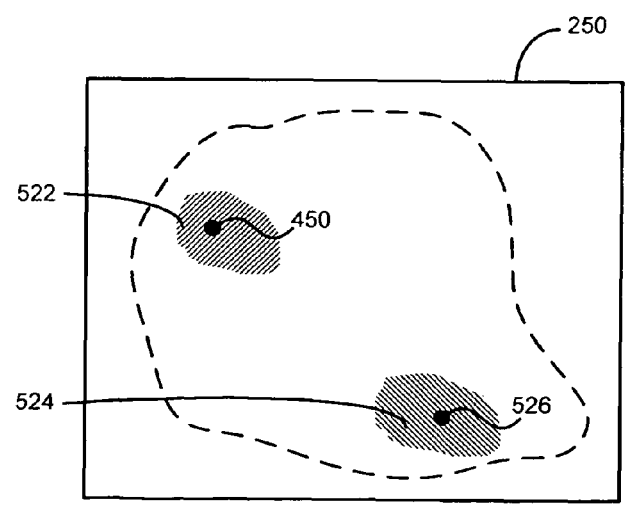
FIG. 5C is a simplified screen shot illustrating the display of estimated locations during an identity theft attack according to an embodiment of the present invention.

FIG. 5C is a simplified screen shot illustrating the display of estimated locations during an identity theft attack according to an embodiment of the present invention. Referring to FIG. 5C, embodiments of the present invention provide for display of the estimated location of various wireless stations on display device 214. For purposes of illustration, the screen dimensions are illustrated by square rectangle 250. For example, the real location 450 of wireless station 204B is illustrated in FIG. 5C. Additionally, the estimated location of the spoofer 204C is indicated by location region 524. Preferably, the location region 524 includes or is substantially close to the actual location 526 of the spoofer 204C. In the illustration shown in FIG. 5C, the actual location 526 is contained within the estimated location 524.

According to embodiments of the present invention, the estimated location is shown as coordinates, location area, location volume, and the like. In the embodiment illustrated in FIG. 5C, the location that is estimated to be farther from the actual known location of the victim AP is indicated as the location of the spoofer. Referring once again to FIG. 5C, two estimated location regions 522 and 524 are displayed. The location region 524 is farther from the actual (known) location 450 of the authorized access point 204B. Thus, the location region 524 is indicated as the estimated location of the spoofer device 204C. Preferably, the location region 524 includes or is substantially close to the actual location of the spoofer device 204C. Although not illustrated in FIG. 5C, other reference locations (e.g., locations of sniffers 208, locations of layout components such as walls, rooms, elevator, passages and the like) are displayed according to embodiments of the present invention. One of ordinary skill in the art would recognize many variations, modifications, and alternatives.

Figure 6:
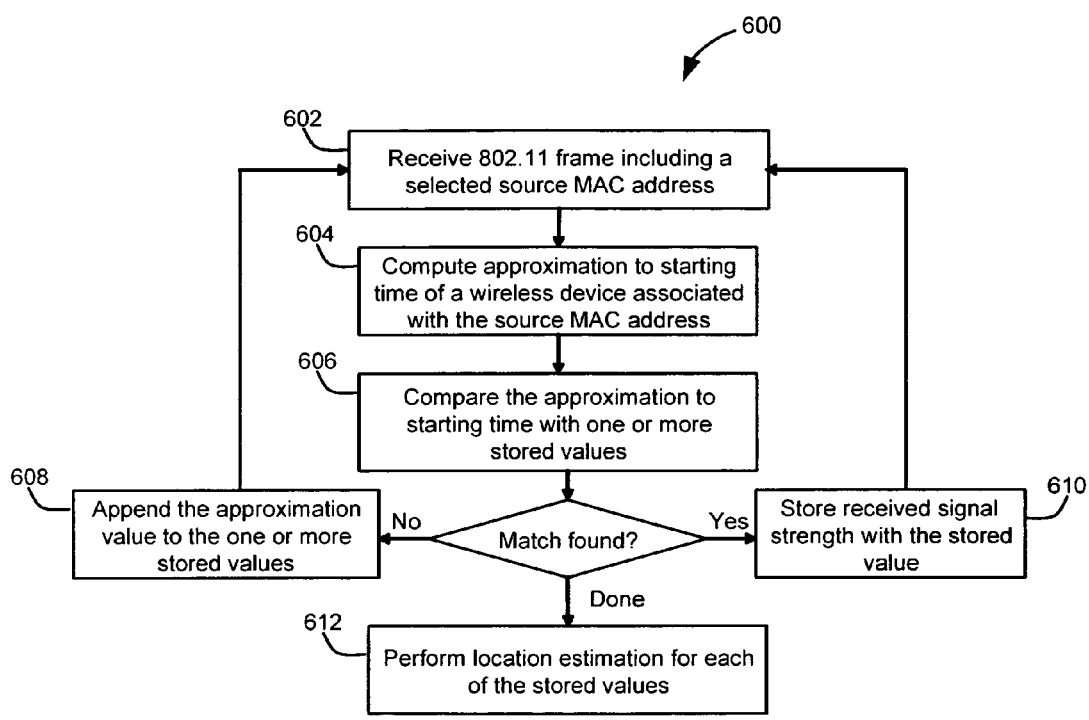
FIG. 6 illustrates a method of identifying frames transmitted from a victim AP and frames transmitted from a spoofer device according to an embodiment of the present invention.

FIG. 6 illustrates a method of identifying frames transmitted from a victim AP and frames transmitted from a spoofer device according to an embodiment of the present invention. Referring to FIG. 5A, the method 600 provides a means of performing step 504, in which wireless signals (e.g., frames) transmitted from a victim AP and wireless signals (e.g., frames) transmitted from a spoofer device are identified from among frames received from a selected MAC address. FIG. 6 is merely an example of an embodiment of the present invention and should not unduly limit the scope of the claims herein. One of ordinary skill in the art would recognize many variations, alternatives, and modifications.

Referring to FIG. 6, the method 600 includes receiving an 802.11 frame including a selected source/transmitter MAC address and a TSF value (602). In an embodiment, the frame includes a beacon frame or a probe response frame. An approximation to the starting time of a wireless device associated with the selected source MAC address is computed using the TSF value for the wireless device. In a specific embodiment, the approximation to a starting time of a wireless device is computed by subtracting the TSF value from a time when the corresponding frame is received by the sniffer.

The approximation to the starting time is compared to one or more stored values (606). If a match between the approximated starting time and a stored value is found, (e.g., within a certain margin for error), the received signal strength associated with the frame is used for location estimation along with other frames (e.g., received in the past and/or future) for which the approximations to the starting time were also matched to the stored value (610). If a match is not found, a new stored value is created and appended to the one or more stored values (608). As further illustrated in FIG. 6, in an embodiment, a separate location estimation process is performed using received signal strengths associated with each of the stored values (step 612).

In various alternative embodiments, the process of identifying wireless signals represented by step 504 uses other techniques to identify frames transmitted from different wireless devices. These techniques include the analysis of sequence numbers in the received frames, the analysis of received signal strengths associated with the received frames, and like. These alternative embodiments will be apparent to one of ordinary skill in the art.

Figure 7A:
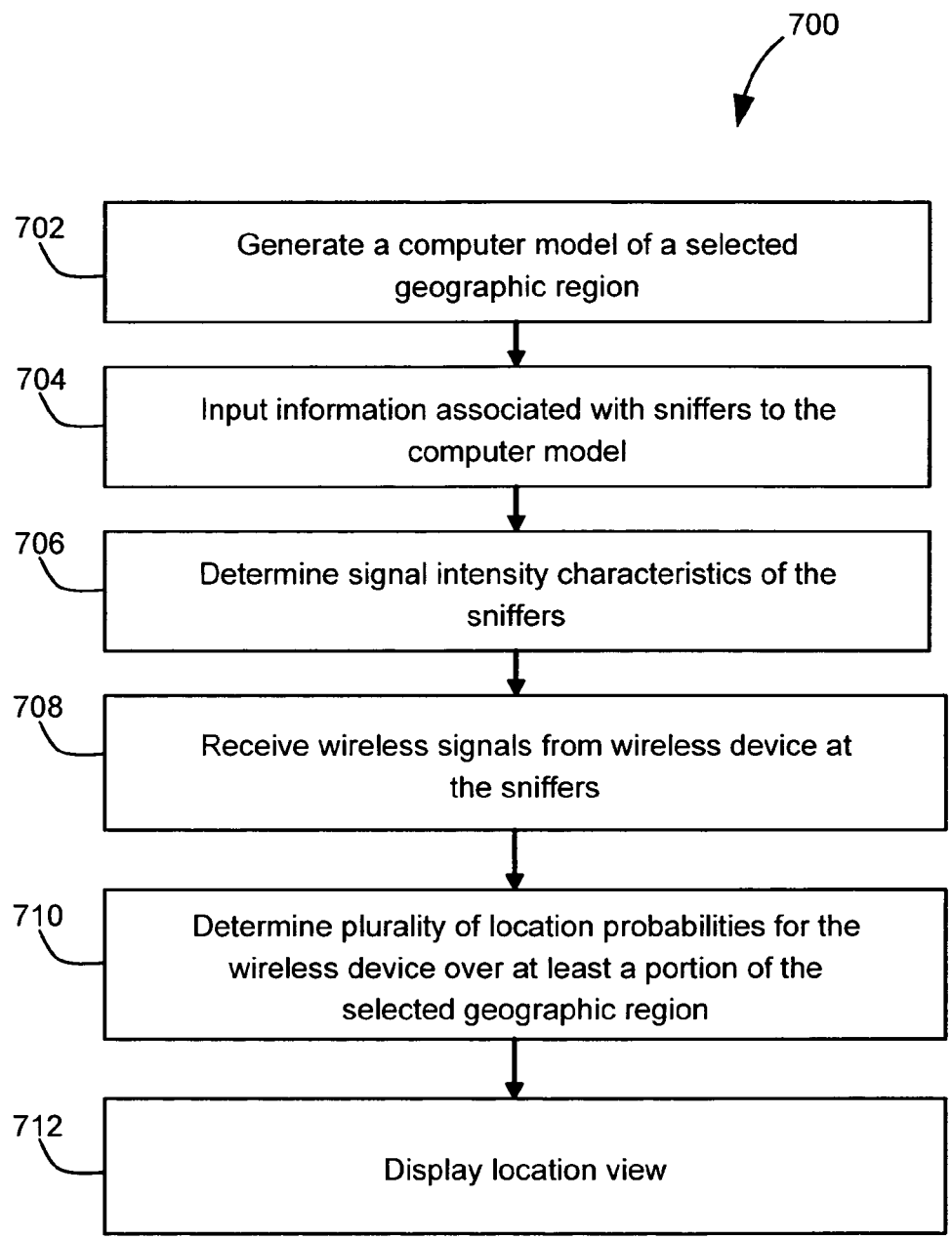
FIG. 7A illustrates a method of performing triangulation for location estimation based on received signal strengths according to an embodiment of the present invention.

FIG. 7A illustrates a method of performing triangulation for location estimation based on received signal strengths according to an embodiment of the present invention. The method 700 is applicable to a variety of embodiments of the present invention, including steps 310, 408, and 508 as described previously. The illustration provided FIG. 7A is merely an example, which should not unduly limit the scope of the claims herein. One of ordinary skill in the art would recognize many variations, alternatives, and modifications.

Referring to FIG. 7A, a computer model is generated of a selected geographic region including a layout (702). For example, the layout is a spatial layout comprising layout components such as walls, rooms, columns, doors, partitions, furniture, foliage, patio, and the like. According to embodiments of the present invention, the computer model includes information associated with the layout components (e.g., physical dimensions, locations, material type, areas of human activity, etc.). Information associated with one or more components of a wireless network is input into the computer model (704). Preferably, the one or more components include at least one or more sniffer devices. The one or more components include one or more authorized access point devices in some embodiments. The information includes, but is not limited to, sniffer/access point locations, antenna types, antenna orientations, and the like.

Merely by way of example, an exemplary embodiment to generate the computer model and input information associated with the wireless network components utilizes an image file representing a spatial layout of the selected geographic region. This image file could include a *.gif, *.jpg, or other file format. In a particular embodiment, the image file depicts a floor plan or a map of the selected geographic region. In another embodiment, the image file is a photograph or a scanned version of the architectural drawing of the floor plan. As will be evident to one of skill in the art, the image file can be displayed on a display device, such as 114 and 214 illustrated previously.

The image can be annotated using a software library of drawing tools. These drawing tools typically allow a user to place objects, e.g., doors, windows, walls, entrances, obstacles, and other objects, in the floor plan. For example, in one embodiment, the drawing tools could allow a user to drag and drop (e.g., with the help of computer mouse or other input device) various objects on the image displayed on the computer screen. In one embodiment, the user can also specify dimensions (e.g., thickness, length, width, height) of the objects. In yet another embodiment, the user can also specify the materials (e.g., brick wall, sheet rock, glass, metal, etc.) of which the various objects are made. In yet another embodiment, the drawing tools also indicates unknown dimensions and/or unknown materials for objects in the layout (i.e., objects for which layout information is unavailable). In one embodiment, the drawing tools also specify one or more regions in the defined geographic region that can be ignored while running computer simulations. In another embodiment, the drawing tools specify regions of activity (e.g., movement of people).

In an alternative embodiment, the computer model is generated using an existing annotated layout image. For example, a layout drawing file prepared by computer aided design (CAD) software could be used.

As represented by process 704 in FIG. 7A, information associated with the sniffers is input to the computer model. This input can include the locations of the sniffers on the layout. In one embodiment, a user can input the locations to the computer model by providing x-y coordinates of the locations. In another embodiment, a user can, with the help of computer mouse, stylus, or other input device, point to a specific location on the computer display of the layout where a device/sniffer is (or will be) placed. In yet another embodiment, the user, with the help of computer mouse, can drag and drop an icon corresponding to the device/sniffer on a computer display of the layout at a desired location. The input information associated with the sniffers may also include information such as antenna type and orientation. In an alternative embodiment, the sniffer locations and characteristics are programmatically generated and provided to the computer model. One of ordinary skill in the art would recognize many variations, modifications, and alternatives.

Figure 7B:
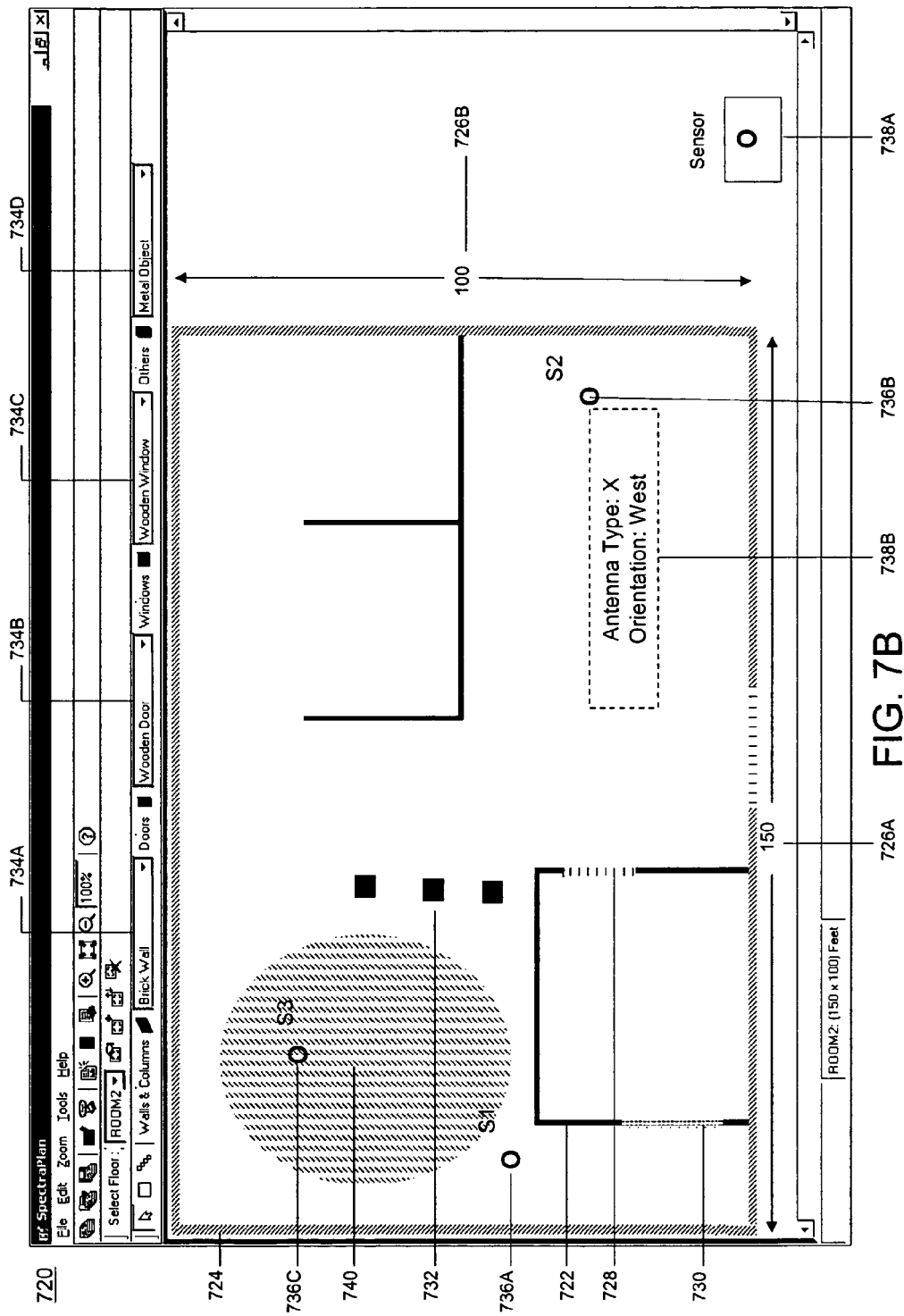
FIG. 7B is a simplified computer screen shot associated with the computer model of the geographic region according to an embodiment of the present invention.

FIG. 7B is a simplified computer screen shot associated with the computer model of the geographic region according to an embodiment of the present invention. This diagram is merely an example, which should not unduly limit the scope of the claims herein. One of ordinary skill in the art would recognize many variations, alternatives, and modifications. The screen shot illustrated in FIG. 7B shows a selected geographic region screen for viewing and editing of a floor map. In this embodiment, different material composition can be indicated by a different line pattern. For example, in the embodiment illustrated in FIG. 7B, walls 722 are made of brick, walls 724 are made of concrete, door 728 is made of wood, window 730 is made of glass, and columns 732 are made of sheet rock. Of course, these objects are merely exemplary and other objects made of similar and alternative materials are included within the scope of the present invention. In the embodiment illustrated in FIG. 7B, the dimensions of various objects in the layout (e.g., dimensions 726A and 726B of concrete walls 724) are also indicated. Regions characterized by a high level of human activity is indicated by reference 740 on the layout.

A number of pull down menus 734A-734D are provided to assist a user in annotating the layout image. The sniffers (e.g., sniffers 736A, 736B, and 736C) are indicated on the layout. The screen shot illustrates a sniffer location screen 738A for positioning the set of sniffers on the floor map. For example, an indication (e.g., an icon) corresponding to a sniffer can be dragged from screen 738A (e.g., using a computer mouse, arrow keys on keyboard, a stylus, and the like) and dropped at selected location on the layout. The screen shot in FIG. 7B also illustrates sniffer information screen 738B for inputting sniffer information regarding a set of sniffers. For example, the screen 738B can be opened by clicking on the sniffer icon. The information (e.g., antenna type and orientation are illustrated) about the corresponding sniffer can then be entered into the screen.

Referring once again to FIG. 7A, signal intensity characteristics are determined over at least a portion of the selected geographic region using the computer model (706). In a specific embodiment, a model is generated for the signal strength received at the sniffer after transmission from a selected location within the selected geographic region. In one embodiment, the received signal strength values for the model are computed by using a ray tracing simulation method. An example of a ray tracing method is described in the paper "A ray tracing approach to predicting indoor wireless transmission," by Reinaldo Valenzuela of AT&T Bell Laboratories, published in the $43^{rd}$ IEEE Vehicular Technology Conference (1993). As described in the Valenzuela paper, the strength (power) of a signal emanating from a transmitter at one location and received at another location (after the signal has suffered reflections and passed through obstructions within the layout) can be computed. Note that through the reversibility characteristic of radio propagation, this value also corresponds to the signal intensity value when the transmitter and the receiver locations are interchanged.

Assuming that the signal power at a reference distance K along every direction from a transmitter equals P_K, the signal power is measured in units of decibels (known as dBm), wherein 1 dBm=10 Log(Power in Watts/1 milliWatt). If the transmitter uses a directional antenna, the signal power at a reference distance 'K' along any direction from a transmitter is also a function of the direction.

An exemplary equation for the power $P\_D_0$ at a point $D_0$ after the signal travels the distance $D_0+K$ from the transmitter without encountering any obstructions or reflections is given by:

$$P\_D_0 \text{ (dBm)} = P\_K \text{ (dBm)} - n*10 \log(D_0/K),$$

where n is the exponent associated with radio wave propagation loss. For example, n=2 or n=1.7 for some applications.

An exemplary equation for the power $P\_D_1$ at a point $D_1$ after the signal travels a distance $D_1+K$ from the transmitter and suffers losses due to an obstruction $L_1$ is given by:

$$P\_D_1 \text{ (dBm)} = P\_K \text{ (dBm)} - n*10 \log(D_1/K) - L_1 \text{ (dBm)}.$$

An exemplary equation for the power $P\_D_2$ at a point $D_2$ after the signal travels the distance $D_2+K$ from the transmitter and suffers losses due to obstructions $L_1$ and $L_2$ and loss due to reflection $R_1$ is given by:

$$P\_D_2 \text{ (dBm)} = P\_K \text{ (dBm)} - n*10 \log(D_2/K) - L_1 \text{ (dBm)} - L_2 \text{ (dBm)} - R_1 \text{ (dBm)}.$$

As will be evident to one of skill in the art, the power $D_m$ at any of $_m$ points due to all possible signal components are computed and summed to generate the overall power prediction of the signal at a given point D. It should be appreciated that in some applications, the exact quantification of variables such as $L_1$, $L_2$, and $R_2$ is sometimes difficult, providing less accurate results than desired. Additionally, in other applications, the user does not know or not provided with adequate information regarding, for example, the dimensions or the material properties of layout objects, to the level of accuracy usually desired for radio level signal prediction.

To account for these situations, in an embodiment, a probabilistic model (e.g., a Gaussian probability distribution) is used to account for these and other uncertainties. This probabilistic model can take into account inherent uncertainties associated with the radio characteristics (e.g., reflection loss, pass-through loss, and the like) of the layout objects, as well as uncertainties arising from inadequate specifications related to layout objects. In one embodiment, each of these variables can be modeled by using a Gaussian probability distribution. The mean and variance of the probability distribution associated with pass-through loss and reflection loss due to various types and sizes of objects can be determined based on laboratory experimentation and stored in a database.

In another embodiment, the probabilistic model takes into account signal variations resulting from changes in the environment (e.g., the movement of people). For example, the signal path that passes through areas of high human activity (e.g., a cafeteria, corridors, conference rooms, etc.) exhibits a higher variability in signal strength. In yet another embodiment, the probabilistic model takes into account signal variations resulting from changes in the state of obstacles. For example, a signal path that passes through a door area exhibits higher attenuation when the door is closed than when it is open or partially open. Other types of factors resulting in signal uncertainty or variations such as imprecise knowledge of antenna radiation patterns and/or orientation of transmitter devices can also be accounted for by assigning appropriate variance to signal loss due to these factors. The total signal power at the reception point is then modeled by a Gaussian probability distribution having mean and variance equal to the sum of mean and variance respectively, of signal powers from all signal paths arriving from the transmission point at the reception point.

In one embodiment, at least a portion of the selected geographic region or the computer representation of the selected geographic region is divided into number of cells. Each of the cells may be rectangular, circular, hexagonal, or any other appropriate shape. Preferably, the cells are as small in size as possible (e.g., 1 millimeter by 1 millimeter squares). For this example, cells typically represent points rather than areas. Cells are represented in the computer representation via their coordinates in either two dimensional (e.g., x-y coordinates) or three dimensional (e.g., x-y-z coordinates) space as applicable.

The received signal strength model is created to represent the received signal strength at each of the sniffer devices from the transmission of a given power level (e.g., 0 dBm) emanating from each of the cells. In order to account for the variability of received signal strength in practical deployments due to a number of factors, such as environmental conditions, imprecise knowledge of materials that various obstacles are made of, movement of people within the selected geographic region, varying signal transmission characteristics of wireless stations manufactured by different vendors, antenna radiation patterns, device orientations, and so on, the signal model preferably represents the probability density function of the received signal strength. The probability density function represents the probability of the received signal strength being within a given interval for a range of intervals. In a specific preferred embodiment, the probability density function is a Gaussian density function with the predicted mean and predicted variance. However, alternative density functions, such as the Rayleigh density function, the Log Normal density function, and others, can also be used. Notably, if the transmission power is p dBm, the resultant predicted mean can be the mean computed for 0 dBm transmit power plus the transmission power p dBm.

Referring once again to FIG. 7A, the wireless signals from a wireless devices (e.g., the wireless device whose location is to be estimated) are received at the sniffers (708). The received signal strength is measured. In a specific embodiment, a function is computed (e.g., average, moving average, exponential moving average, etc.) of the actual received signal strengths for one or more wireless signals at the sniffer. Preferably the received signal strength is measured by a number of the sniffers.

Step 710 includes estimating the location of the wireless device. In an embodiment, this step includes determining a number of probabilities associated with a number of locations in at least a portion of the selected geographic region. The number of probabilities can correspond to the probabilities of the wireless device being located at the number of locations. The probabilities can be computed utilizing at least information associated with the signal intensity characteristics and the received signal strength associated with the wireless signals from the wireless device that is measured by the sniffers.

In an embodiment, the location density (L(x,y)) is computed. The location density is defined as the probability of the received signal strength emanating from a transmission from the cell with coordinates (x,y) being within a small interval around each of the measured signal strength values at the one or more sniffers. This computation is based on the probability density function for the received signal strength previously calculated. Based on the principle of conditional probability, the probability of the wireless station being located at cell (x,y) is then proportional to L(x,y). The values of L(x,y) or other values that are proportional to L(x,y) are then represented on the display device in relation to the layout of the selected geographic region (712). In embodiments of the present invention, the values are displayed using a number of colors or gradations of one or more colors. Alternatively, the various ranges of these values may be displayed.

In some embodiments, additional processes are performed when the value of p cannot be determined from vendor information of the wireless transmitter, for example, due to the fact that the vendor's transmitter device allows for multiple possibilities of transmit powers. In these embodiments, the principle of "hypothesis testing" is used. The values of L(x,y) are computed for all transmit power levels that are known to be transmitted by the wireless transmitter of interest. In a specific embodiment based on a "maximum likelihood estimate," the values of L(x,y) at all cells are summed for each of the power levels and the power level for which the sum is maximum is taken to be the estimate of transmit power. In one embodiment, the values of L(x,y) for this most likely transmit power are displayed. In an alternative embodiment, the value displayed at any cell is proportional to the sum total of L(x,y) at that cell over all possible transmit powers. The hypothesis testing principle can also be applied to account for factors including, but not limited to, the antenna orientation of the wireless station.

Figure 7C:
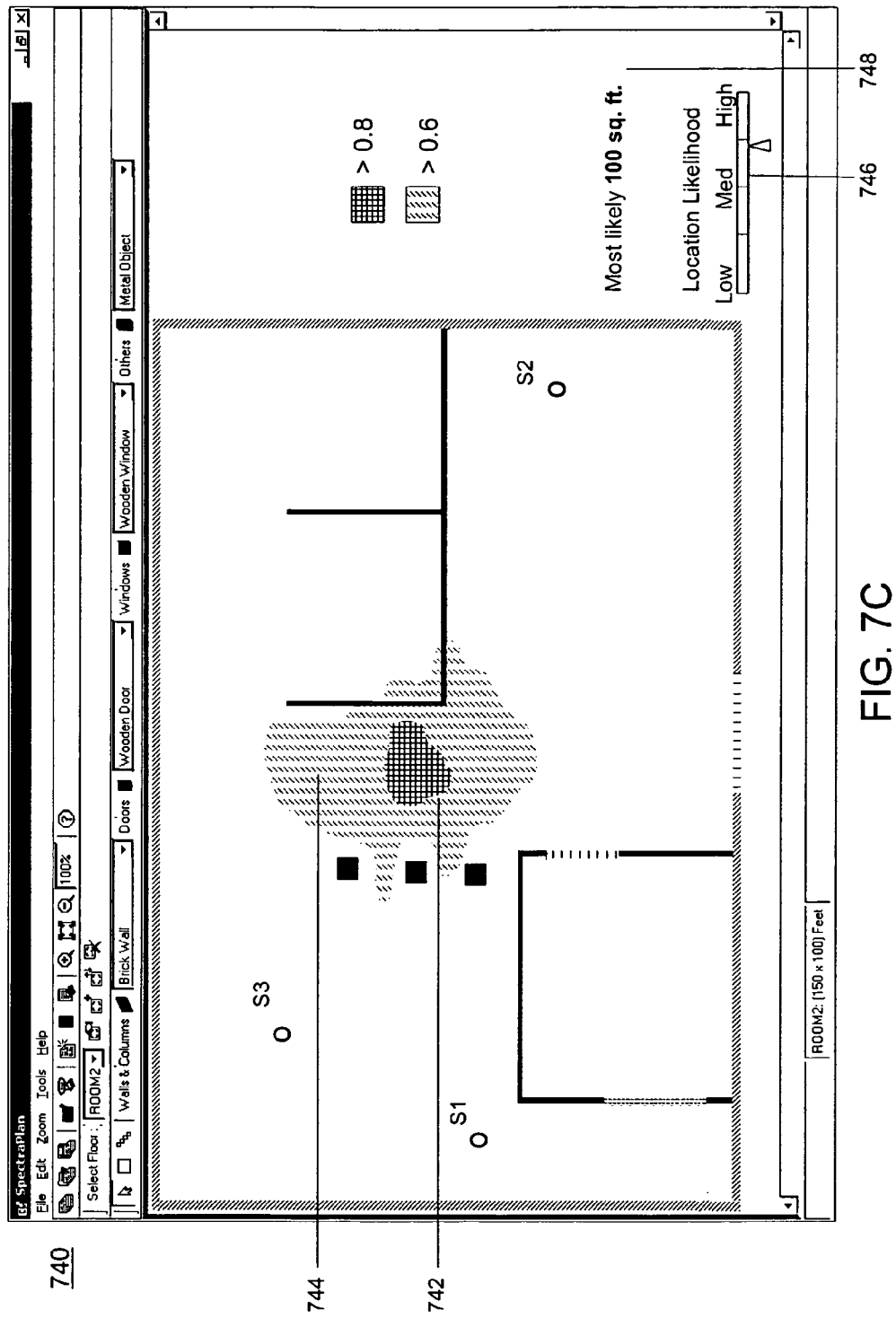
FIG. 7C is another simplified computer screen shot of location probabilities displayed in relation to the layout of the geographic region according to an embodiment of the present invention.

FIG. 7C is another simplified computer screen shot of location probabilities displayed in relation to the layout of the geographic region according to an embodiment of the present invention. This diagram is merely an example, which should not unduly limit the scope of the claims herein. One of ordinary skill in the art would recognize many variations, alternatives, and modifications. Merely by way of example, two regions 742 and 744 are shown in FIG. 7C. Regions 742 and 744 correspond to different probability ranges (e.g., greater than 0.8 and greater than 0.6, respectively). Using an object on the input screen (e.g., the slider bar 746), the user can select the desired location likelihood level. In an exemplary specific embodiment, when the selected location likelihood is larger, the cells for which the location density is larger are displayed. This advantageously enables zeroing in on the most likely location (e.g., by choosing a larger value for the location likelihood) or viewing a wider distribution (e.g., by choosing a smaller value for the location likelihood). Using the input screen 748, the user can also specify the area of most likely locations that he or she desires to view.

The various embodiments of the present invention may be implemented as part of a computer system. The computer system may include a computer, an input device, a display unit, and an interface. Additionally, the computer system may access the Internet. Furthermore, the computer may include a microprocessor. The microprocessor may be connected to a communication bus. The computer may also include a memory. The memory may include Random Access Memory (RAM), Read Only Memory (ROM), and/or other memory types. The computer system may further include a storage device, which may be a hard disk drive or a removable storage drive such as a floppy disk drive, optical disk drive, and the like. The storage device can also be other similar means for loading computer programs or other instructions into the computer system.

As used herein, the term 'computer' may include any processor-based or microprocessor-based system including systems using microcontrollers, digital signal processors (DSP), reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term 'computer.' The computer system executes a set of instructions that are stored in one or more storage elements, in order to process input data. The storage elements may also hold data or other information as desired or needed. The storage element may be in the form of an information source or a physical memory element within the processing machine.

The set of instructions may include various commands that instruct the processing machine to perform specific operations such as the processes of the various embodiments of the invention. The set of instructions may be in the form of a software program. The software may be in various forms such as system software or application software. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, the terms 'software' and 'firmware' are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of estimating a location of a wireless device, the method comprising:
    disposing a plurality of sniffers in a geographic region;
    receiving a plurality of wireless signals using one or more of the plurality of sniffers;
    processing the plurality of wireless signals to identify a subset of the plurality of wireless signals that are associated with the wireless device;
    determining a plurality of received signal strengths associated with the subset of the plurality of wireless signals; and
    providing an estimation of the location of the wireless device utilizing the determined received signal strengths associated with the subset of the plurality of wireless signals,
    wherein the processing the plurality of wireless signals comprises:
    obtaining a first frame from the plurality of wireless signals;
    identifying a first wireless device by estimating a first starting time for the first wireless device utilizing a first TSF value included in the first frame;
    obtaining a second frame from the plurality of wireless signals;
    identifying a second wireless device by estimating a second starting time for the second wireless device utilizing a second TSF value included in the second frame, wherein the first TSF value and the second TSF value are different; and identifying a subset of the plurality of wireless signals associated with either the first or the second wireless device.

2. A method of estimating a location of a spoofer wireless device, the method comprising:

positioning a plurality of sniffers in a geographic region;

receiving a plurality of wireless signals using one or more of the plurality of sniffers from a first wireless device and a second wireless device, wherein header information associated with the plurality of wireless signals indicates that the plurality of wireless signals are transmitted from a wireless device associated with a first MAC address;

obtaining a first frame from the plurality of wireless signals;

estimating a first starting time for the first wireless device utilizing the first frame;

obtaining a second frame from the plurality of wireless signals;

estimating a second starting time for the second wireless device utilizing the second frame, wherein the first starting time and the second starting time are unequal; and estimating a location of at least one of the first wireless device or the second wireless device.

3. The method of claim 2 wherein the first frame comprises a first TSF value and the second frame comprises a second TSF value.

4. The method of claim 2 wherein at least one of the first wireless device or the second wireless device is the spoofer device.

5. The method of claim 2 further comprising displaying the location of at least one of the first wireless device or the second wireless device on a display device.

6. The method of claim 5 further comprising concurrently displaying a location of a network device on the display device.

7. The method of claim 2 further comprising:

obtaining additional frames from the plurality of wireless signals;

estimating additional starting times utilizing the additional frames;

relating one or more of the additional frames to the first wireless device based on the estimated first starting time to form a set of frames associated with the first wireless device; and relating one or more of the additional frames to the second wireless device based on the estimated second starting time to form a set of frames associated with the second wireless device.

8. The method of claim 7 further comprising estimating a location of the first wireless device utilizing a set of received signal strengths associated with the set of frames associated with the first wireless device.

9. The method of claim 7 further comprising estimating a location of the second wireless device utilizing a set of received signal strengths associated with the set of frames associated with the second wireless device.

10. A method of estimating a location of a MAC spoofing device in a wireless network, the method comprising:

(a) positioning a plurality of sniffers in a geographic region;

(b) receiving a plurality of 802.11 frames using one or more of the plurality of sniffers, wherein header information associated with the plurality of 802.11 frames indicates that the plurality of 802.11 frames are transmitted from a wireless device associated with a first MAC address;

(c) processing a first frame from the plurality of 802.11 frames to compute an approximation to a starting time for a first wireless device associated with the first MAC address;

(d) storing the approximation to the starting time for the first wireless device in a location of a memory;

(e) processing a second frame from the plurality of 802.11 frames to compute an approximation to a starting time for a second wireless device, wherein the second wireless device is the MAC spoofing device;

(f) storing the approximation to the starting time for the second wireless device in another location of the memory; and (g) estimating locations of the first wireless device and the second wireless device.

11. The method of claim 10 further comprising displaying the locations of the first wireless device and the second wireless device on a display device.

12. The method of claim 10 further comprising:

repeating steps (b)-(f) for subsequent frames of the plurality of 802.11 frames.

13. A method of estimating a location of a MAC spoofing device in a wireless network, the method comprising:

(a) positioning a plurality of sniffers in a geographic region;

(b) receiving an 802.11 frame using one or more of the plurality of sniffers, wherein header information associated with the 802.11 frame indicates that the 802.11 frame is transmitted from a wireless device associated with a first MAC address;

(c) processing the 802.11 frame to compute an approximation to a starting time;

(d) comparing the approximation to the starting time to one or more values in a list stored in a memory to ascertain the presence of a match;

(e) storing a received signal strength value in a memory location associated with one of the one or more values in the list if comparing the approximation to the starting time produced a match;

(f) appending the approximation to the starting time to the list if comparing the approximation to the starting time did not produce a match;

(g) repeating steps (b) through (f) until the list comprises at least two starting time values; and (h) estimating a location for one or more wireless devices associated with the stored values.

14. The method of claim 13 wherein processing the 802.11 frame to compute an approximation to a starting time comprises subtracting a TSF value for the 802.11 frame from a received time.

15. The method of claim 13 wherein a match comprises a predetermined difference between the approximation to the starting time and the stored value.

16. The method of claim 13 wherein estimating a location for one or more wireless devices comprises triangulating using the received signal strength values associated with one of the one or more values in the list.

17. The method of claim 13 further comprising displaying the location of the MAC spoofing device on a display device.

18. The method of claim 1 wherein the estimation of the location is provided in relation to the geographic region.

19. The method of claim 1 wherein the providing the estimation of the location comprises displaying the estimation of the location in relation to layout of the geographic region.

20. The method of claim 1 wherein the providing the estimation of the location comprises providing the estimation of the location in relation to a co-ordinate system.

21. A method of estimating a location of a wireless device, the method comprising:
- disposing a plurality of sniffers in a geographic region;
- receiving a plurality of wireless signals at one or more of the plurality of sniffers;
- obtaining a first frame from the plurality of wireless signals;
- identifying a first wireless device by estimating a first starting time for the first wireless device utilizing a first TSF value included in the first frame;
- identifying a first subset of the plurality of wireless signals that are associated with the first wireless device based upon the estimated first starting time;
- obtaining a second frame from the plurality of wireless signals;
- identifying a second wireless device by estimating a second starting time for the second wireless device utilizing a second TSF value included in the second frame, the estimate of the second starting time being different from the estimate of the first starting time;
- identifying a second subset of the plurality of wireless signals that are associated with the second wireless device based upon the estimated second starting time;
- providing an estimation of location of the second wireless device utilizing at least one received signal strength associated with the second subset of the plurality of wireless signals,
- wherein the second wireless device spoofs MAC address of the first wireless device.

22. The method of claim 21 wherein the estimation of the location of the second wireless device is provided in relation to the geographic region.

23. The method of claim 21 wherein the providing comprises displaying the estimation of the location of the second wireless device in relation to layout of the geographic region.

24. The method of claim 21 wherein the providing comprises providing the estimation of the location of the second wireless device in relation to a co-ordinate system.

* * * * *